US006286013B1

(12) United States Patent
Reynolds et al.

(10) Patent No.: US 6,286,013 B1
(45) Date of Patent: *Sep. 4, 2001

(54) METHOD AND SYSTEM FOR PROVIDING A COMMON NAME SPACE FOR LONG AND SHORT FILE NAMES IN AN OPERATING SYSTEM

(75) Inventors: Aaron R. Reynolds, Redmond; Dennis R. Adler, Mercer Island; Ralph A. Lipe, Woodinville; Ray D. Pedrizetti, Issaquah; Jeffrey T. Parsons; Rasipuram V. Arun, both of Redmond, all of WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/787,021

(22) Filed: Jan. 28, 1997

Related U.S. Application Data

(63) Continuation of application No. 08/356,010, filed on Dec. 13, 1994, now abandoned, which is a continuation-in-part of application No. 08/041,497, filed on Apr. 1, 1993, now abandoned, which is a continuation-in-part of application No. 08/042,004, filed on Apr. 24, 1995, now Pat. No. 5,579,517, which is a continuation-in-part of application No. 08/711,692, filed on Sep. 5, 1996, now Pat. No. 5,758,352.

(51) Int. Cl.⁷ .................................................... G06F 17/30

(52) U.S. Cl. .................... 707/200; 707/203; 707/205; 710/262; 395/500

(58) Field of Search .................................. 395/616, 500, 395/500.41; 707/200, 100, 203, 205; 710/261, 262

(56) References Cited

U.S. PATENT DOCUMENTS

| 4,780,821 | * | 10/1988 | Crossley ............................... 395/670 |
| 4,987,531 | | 1/1991 | Nishikado et al. .................. 707/200 |

(List continued on next page.)

FOREIGN PATENT DOCUMENTS

| 0462587 | * | 6/1991 | (EP) | ............................... G06F/15/40 |
| 1041039 | | 2/1989 | (JP) | ............................... G06F/12/00 |
| 1315843 | | 12/1989 | (JP) | ............................... G06F/12/00 |
| 2148341 | | 6/1990 | (JP) | ............................... G06F/12/00 |
| 6019763 | | 1/1994 | (JP) | ............................... G06F/12/00 |

OTHER PUBLICATIONS

Bonner, Paul "What's in a Name?", PC–Computing, v2, n6, p169(2), Sep. 1989.*

Duncan, Ray, "Power Programming Using Long Filenames and Extended Attributes, Part 1", pp. 317–323, Apr. 24, 1990.*

Duncan, Ray, "Power Programming Using Long Filenames and Extended Attributes, Part 2", p. 305–309, May 15, 1990.*

(List continued on next page.)

Primary Examiner—Thomas G. Black
Assistant Examiner—Charles L. Rones
(74) Attorney, Agent, or Firm—Christensen O'Connor Johnson Kindness PLLC

(57) ABSTRACT

An operating system provides a common name space for both long filenames and short filenames. In this common namespace, a long filename and a short filename are provided for each file. Each file has a short filename directory entry and may have at least one long filename directory entry associated with it. The number of long filename directory entries that are associated with a file depends on the number of characters in the long filename of the file. The long filename directory entries are configured to minimize compatibility problems with existing installed program bases.

24 Claims, 8 Drawing Sheets

U.S. PATENT DOCUMENTS

| | | | | |
|---|---|---|---|---|
| 5,307,494 | * | 4/1994 | Yasumatsu et al. | 395/600 |
| 5,313,646 | | 5/1994 | Hendricks et al. | 707/101 |
| 5,329,427 | * | 7/1994 | Barrett et al. | 395/600 |
| 5,359,725 | * | 10/1994 | Garcia et al. | 395/438 |
| 5,363,487 | * | 11/1994 | Willman et al. | 395/275 |
| 5,363,497 | * | 11/1994 | Willman et al. | 395/828 |
| 5,371,885 | | 12/1994 | Letwin | 707/205 |
| 5,388,257 | | 2/1995 | Bauer | 707/1 |
| 5,392,427 | | 2/1995 | Barrett et al. | 707/205 |
| 5,412,808 | | 5/1995 | Bauer | 707/1 |
| 5,421,001 | | 5/1995 | Methe | 707/1 |
| 5,434,974 | | 7/1995 | Loucks et al. | 707/101 |
| 5,437,029 | | 7/1995 | Sinha | 707/200 |
| 5,483,652 | | 1/1996 | Sudama et al. | 707/10 |
| 5,535,375 | * | 7/1996 | Eshel et al. | 391/500 |
| 5,579,517 | * | 11/1996 | Reynolds et al. | 707/200 |
| 5,596,755 | * | 1/1997 | Pletcher et al. | 710/261 |
| 5,627,996 | * | 5/1997 | Bauer | 395/500.41 |
| 5,694,606 | * | 12/1997 | Pletcher et al. | 710/261 |
| 5,745,752 | * | 4/1998 | Hurvig et al. | 707/200 |
| 5,745,902 | | 4/1998 | Miller et al. | 707/200 |
| 5,754,848 | * | 5/1998 | Hanes | 707/200 |
| 5,758,352 | * | 5/1998 | Reynolds et al. | 707/200 |
| 5,761,675 | * | 6/1998 | Isenberg | 707/200 |
| 5,765,169 | * | 6/1998 | Conner | 707/200 |
| 5,819,275 | * | 11/1998 | Badger et al. | 707/100 |
| 5,926,805 | * | 7/1999 | Hurvig et al. | 707/2 |
| 6,055,527 | * | 4/2000 | Badger et al. | 707/2 |

OTHER PUBLICATIONS

"Above Software Introduces 'Golden Retriever 2.0b' ", News Release, Mar. 29, 1993.*

O'Malley, Chris "Fetching Desktop Files: Standalone Document Managers", Window Sources, v1, n2, p443(1), Mar. 1993.*

Mallory, Jim "Breakthrough on DOS Filename Limits", Newsbytes, NEW04120025, Apr. 12, 1993.*

Trivette, Donald B. "Utility Provides 60–Character Filenames", PC Magazine, v7, n16, p56(1), Sep. 27, 1988.*

"World Software Corporation (WSC) Launches Extend–A–Name in Europe", Consumer Product Update, Jul. 17, 1990.*

McCormick, John "Presentation Manager Under OS/2 Encourages Lengthy Name–Calling", Government Computer News, v9, n10, p16(2), May 14, 1990.*

Rohan, Rebecca "Golden Retriever Fetches Files in Windows", Computer Shopper, v12, n11, p947(1), Nov. 1992.*

Bonner, Paul "Build A Document Manager Under Windows", PC–Computing, v4, n12, p275(7), Dec. 1991.*

Glass, Brett "Create Your Own Environment", PC–Computing, v3, n10, p106(6), Oct. 1990.*

"New Improved Windows", PC World, v11, n12, p252(3), Dec. 1993.*

"The Intelligent Way to Search", New Release, Dateline: Burlington, MA, Oct. 1987.*

"Breakthrough on DOS File Name Limits", Newsbytes News Network, Apr. 12, 1993.*

"File Sharing Protocol" (also available as Intel PN 138448), Microsoft Corp, Nov. 7, 1988.*

Hurwicz, Mike "MS–DOS 3.1 Makes it Easy to Use IBM PCs on a Network", Data Communications, pp. 223–237, Nov. 1985.*

Wang, Y.E.G., "Universal File Names for Ada," Ada Letters, Integrated Software, Inc., New York, NY, Jan./Feb. 1990, pp. 111–117.

Samuel J. Leffler et al., "The Design and Implementation of the 4.3BSD UNIX Operating System," Addison–Wesley Publishing Company, 1989; Chapter 2, pp. 34–36.

Ray Duncan, "Design Goals and Implementation of the New High Performance File System," Microsoft Systems Journal, Sep. 1989, pp. 1–13.

Duncan, Ray, "Using long filenames and extended attributes," PC Magazine 9(8), p. 317(5), Apr. 24, 1990.

Duncan, Ray, "Using long and extended attributes," PC Magazine 9(9); 305(5), May 15, 1990.

Hurwicz, Mike, "MS–DOS 3.1 Makes It Easy to Use IBM PCs on a Network," Data Communications, Nov., 1985.

"The Intelligent Way to Search," News Release, Dateline: Burlington, MA, Oct., 1987.

Trivette, Donald B., "Utility Provides 60–Character Filenames," PC Magazine, vol. 7, N. 16, p. 56(1), Sep., 1988.

"File Sharing Protocol," Microsoft Corporation, Nov. 7, 1988.

Bonner, Paul, "What's in a Name?," PC–Computing, vol. 2, N. 9, p. 169(2), Sep., 1989.

Duncan, Ray, "Power Programming Using Long Filenames and Extended Attributes, Part 1," PC Magazine, pp. 317–323, Apr. 24, 1990.

McCormick, John, "Presentation Manager Under OS/2 Encourages Lengthy Name–Calling," Government Computer News, vol. 9, N. 10, p. 16(2), May 14, 1990.

Duncan Ray, "Power Programming Using Long Filenames and Extended Attributes, Part 2,"PC Magazine, pp. 305–309, May 15, 1990.

"World Software Corporation (WSC) Launches Extend–A–Name in Europe," Computer Product Update, Jul. 27, 1990.

Glass, Brett, "Create Your Own Environment," PC–Computing, vol. 3, N. 10, p. 106(6), Oct., 1990.

Bonner, Paul, "Build a Document Manager Under Window," PC–Computing, vol. 4, N. 12, p. 275(7), Dec., 1991.

Rohan, Rebecca, "Golden Retriever Fetches Files in Windows," Computer Shopper, vol. 12, N. 11, p. 947(1), Nov., 1992.

O'Malley, Chris, "Fetching Desktop Files: Standalone Document Managers," Window Sources, vol. 1, N. 2, p. 443(1), Mar., 1993.

"Above Software Introduces Golden Retriever 2.0b'," News Release, Dateline: Irvine, CA, Mar. 29, 1993.

"Breakthrough on DOS File Name Limits," Newsbytes News Network, Apr. 12, 1993.

Mallory, Jim, "Breakthrough on DOS Filename Limits," Newsbytes, Apr. 12, 1993.

"New Improved Windows," PC World, vol. 11, N. 12, p. 252(3), Dec., 1993.

* cited by examiner

METHOD AND SYSTEM FOR PROVIDING A COMMON NAME SPACE FOR LONG AND SHORT FILE NAMES IN AN OPERATING SYSTEM

CROSS-REFERENCE TO RELATED APPLICATION

This application is a continuation of U.S. patent application Ser. No. 08/356,010, filed Dec. 13, 1994, now abandoned, which was a continuation-in-part of U.S. patent application Ser. No. 08/041,497, filed Apr. 1, 1993, now abandoned.

TECHNICAL FIELD

The present invention relates generally to data processing systems and, more particularly, to a common name space for long and short filenames.

BACKGROUND OF THE INVENTION

Many operating systems, such as the MS-DOS, version 5, operating system, sold by MICROSOFT Corporation of Redmond, Wash., support only short filenames. In the MS-DOS, version 5, operating system, filenames may be a maximum length of eleven characters. Each filename may have a main portion of eight characters followed by an extension of three characters. An example filename in the MS-DOS, version 5, operating system is "EXAMPLE1.EXE", wherein "EXAMPLE1" constitutes the main portion and "EXE" constitutes the extension.

Each filename is limited to eleven characters due to constraints in the file system of the MS-DOS, version 5, operating system. This file system employs a directory structure in which each file has a directory entry associated with it. Unfortunately, the directory entry for a file only supports filenames with a maximum length of eleven characters. Such a limit in the length of the filenames is often frustrating to a user. The length limit of eleven characters prevents a user from employing adequately descriptive filenames and, in many instances, forces a user to insert awkward abbreviations of descriptive terms into the filename.

SUMMARY OF THE INVENTION

It is, therefore, an object of the present invention to provide a system that supports long filenames.

It is another object of the present invention to provide a system that supports long filenames while minimizing the compatibility impact of supporting long filenames.

It is a further object of the present invention to provide a system that supports a common name space for both long filenames and short filenames.

In accordance with the first aspect of the present invention, a method is practiced in a data processing system having a memory means and a processing means. In accordance with this method, a first directory entry is created and stored in the memory means for a file. The first directory entry holds a first filename for the file and information about the file. A second directory entry is also created and stored in the memory means. The second directory entry holds at least one portion of a second filename having a fixed number of characters and information about the file. One of the first or second directory entries is accessed in the memory means to gain access to the information contained therein.

In accordance with another aspect of the present invention, a data processing system includes a memory that holds a first directory entry for a file, a second directory entry for the file, and an operating system. The first directory entry includes a first filename for the file and the second directory entry includes the second filename for the file. The second filename includes more characters than the short filename. The data processing system also includes a processor for running the operating system and accessing either the first directory entry or the second directory entry to locate the file.

In accordance with yet another aspect of the present invention, a method is practiced in a data processing system having memory. In accordance with this method, a file is created and the file is assigned a user-specified long filename. The long filename is manipulated with the data processing system to create a short filename of fewer characters. The long filename and the short filename are stored in memory so that the file can be accessed by either the long filename or the short filename.

In accordance with a further aspect of the present invention, a method is practiced in which a first directory entry for a file is stored in a memory means. The first directory entry holds the short filename for the file. The short filename includes at most a maximum number of characters that is permissible by an application program. A second directory entry is also stored in the memory means for the file. A second directory entry holds at least the first portion of a long filename for the file. The long filename includes a greater number of characters than the maximum number of characters that is permissible by the application program. The application program is run on a processor of the data processing system. The application program identifies the file by the short filename.

In accordance with a still further aspect of the present invention, a method is practiced in which a first directory entry is stored in the memory means for a file. The first directory entry holds a short filename for the file that includes at most the maximum number of characters that is permissible by the operating system. A second directory entry is stored in the memory means for the file. The second directory entry holds a long filename for the file that includes more than the maximum number of characters that is permissible by the operating system. In this instance, the operating system does not use long filenames; rather, it uses solely short filenames. The first directory entry is accessed by the operating system to locate the file.

BRIEF DESCRIPTION OF THE DRAWINGS

A preferred embodiment of the present invention will now be described herein with reference to the Drawings. The Drawings include the following Figures.

DETAILED DESCRIPTION OF THE INVENTION

Figure 1:
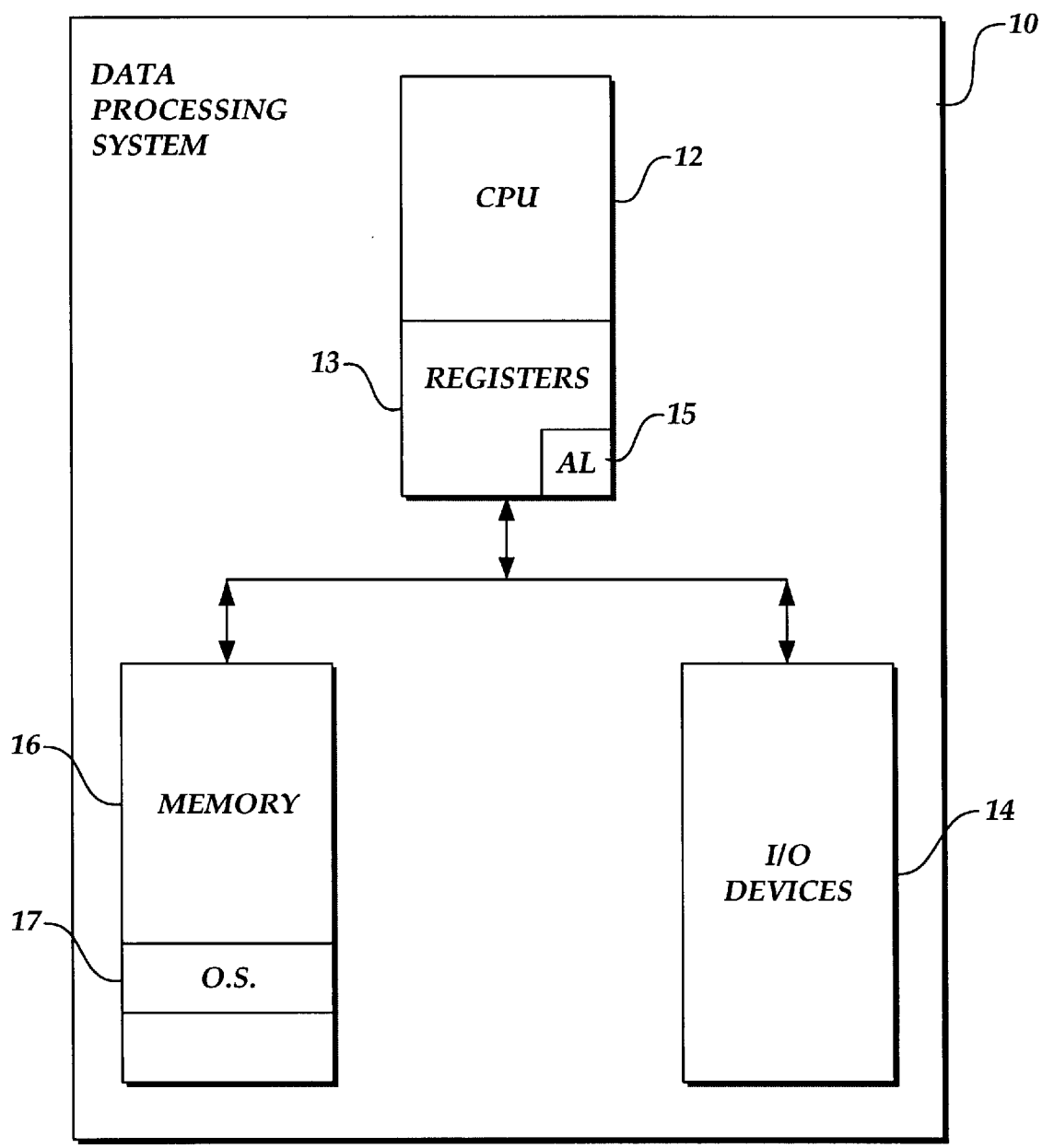
FIG. 1 is a block diagram of a data processing system used for implementing the preferred embodiment of the present invention.

A preferred embodiment of the present invention described herein provides support for the use of long filenames (i.e., filenames that may have substantially more characters than current operating systems, such as the MS-DOS, version 5, operating system permit). "Short filenames" will be used hereinafter to refer to filenames that have a small limit (such as 11 characters) as to the maximum number of characters permitted. In the preferred embodiment, the long filenames are provided in a common name space with the short filenames. A long filename and a short filename are provided for each file in the system. The sharing of a common name space is realized through providing separate directory entries for long filenames and short filenames. Each file has a short filename directory entry associated with it and may also have at least one long filename directory entry. The short filenames are like those provided previously in the MS-DOS, version 5, operating system. The long filenames, as will be described in more detail below, may have a maximum length of up to 255 characters. The preferred embodiment will be described with reference to an implementation with the MS-DOS, version 5, operating system.

The potential compatibility problems of supporting long filenames are apparent by considering one solution to the problem of short filenames. This solution is not part of the present invention and is described herein merely to illustrate how a preferred embodiment avoids the compatibility problems suffered by this proposed solution. This solution supports long filenames by merely increasing the number of characters the operating system permits for a filename.

There are two major difficulties with this solution. First, the existing application bases of many systems use only short filenames (e.g., 11 characters or less) and are not prepared to utilize only long filenames (e.g., up to 255 characters). As an example, an application may allocate a buffer large enough to hold the short filename and if the operating system tries to place long filename data into this buffer, the buffer may overflow so as to cause the application data to be unexpectedly overwritten. Second, certain disk utility programs access the file system volume directly and, thus, do not rely on the operating system to access the files. If the file system is changed to support long filenames, compatibility problems with the disk utility programs arise.

The preferred embodiment of the present invention described herein, in contrast, seeks to minimize the compatibility impact of supporting long filenames by providing both a long filename and a short filename for each file. As a result, applications and utilities that require short filenames still have short filenames available, and applications that use long filenames have long filenames available.

The preferred embodiment of the present invention may be implemented as code realized as software or firmware. In order to support long filenames, the preferred embodiment of the present invention provides several long filename application program interfaces (APIs). These APIs are provided along with the conventional short filename interfaces that are standard with the operating system. The long filename APIs support file operations and directory entries for long filenames. The APIs include a file attributes function, a file delete function, a file directory function, a file find function, a file open/create function and a file rename function.

The preferred embodiment of the present invention may be implemented in a data processing system 10 like that shown in FIG. 1. This data processing system 10 includes a central processing unit (CPU) 12 with a standard set of registers 13 that includes an accumulator (AL) register 15, a memory 16 and input/output (I/O) devices 14. The CPU 12 oversees the operations of the data processing system 10 and has access to the memory 16 and the I/O devices 14. The memory 16 may include both RAM and disc storage. The memory 16 holds an operating system 17 (denoted as "O.S." in FIG. 1) which includes the long and short filename APIs. Those skilled in the art will appreciate that the present invention may be implemented on other suitable data processing systems.

All of the functions for the long filename APIs and short filename APIs are incorporated into the operating system 17. Those functions are supported through an Int 21h interrupt call (where 21h denotes 21 in hexadecimal notation). In other words, all the functions are called by executing an Int 21h interrupt, wherein the function that is called through the Int 21h interrupt is specified by a value placed in a register, as will be described in more detail below. The Int 21h interface is like that provided in the MS-DOS, version 5, operating system except that the interface also supports calls to functions for long filenames. In calls to the long filename APIs, the function number to be called is placed in the AL register 15 of a processor, such as the CPU 12 in FIG. 1 before the interrupt is initiated.

In order to support both a long filename and a short filename for each file, the preferred embodiment provides a short filename directory entry 18 (FIG. 2) and may provide at least one long filename directory entry 20 for each file in a common name space. Each file has a long filename and a short filename associated with it. A long filename directory entry 20 is only created when the long filename cannot be correctly stored in the short filename directory entry. The long filename directory entries 20 are stored adjacent to the corresponding short filename directory entry 18 as part of the common name space used in memory 16. Moreover, the long filename directory entries 20 are configured to minimize compatibility problems with operating systems that support only short filenames.

Figure 2:
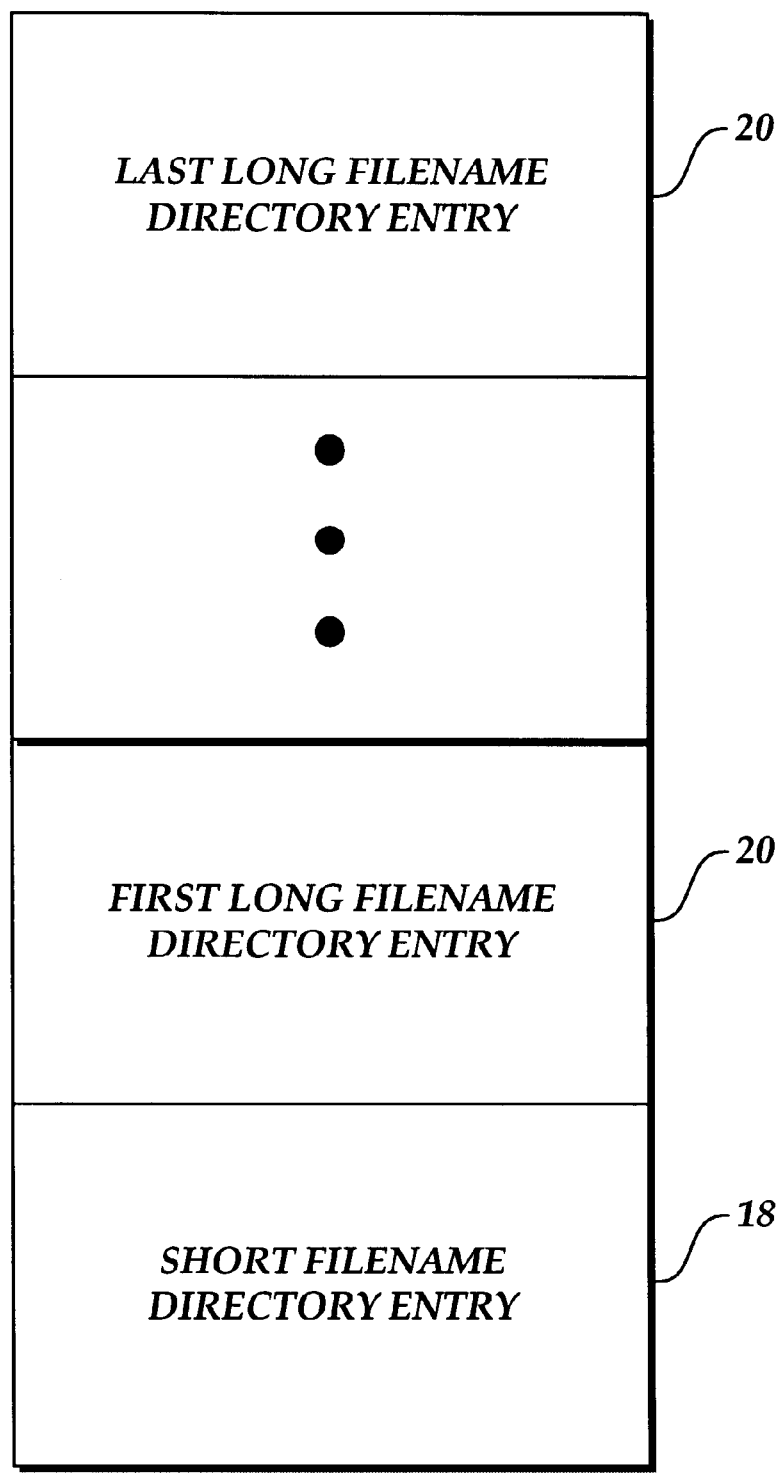
FIG. 2 is a block diagram illustrating the storage of short filename directories in locations adjacent to long filename directory entries.

FIG. 2 shows an example of the directory entries 18 and 20 for a file in the preferred embodiment described herein. The short filename directory entry 18 is provided along with several long filename directory entries 20. The number of long filename directory entries 20 provided (including zero long filename directory entries) for a file depends upon the number and type of characters in the long filename. As will be described in more detail below, each long filename directory entry 20 may hold up to 26 characters of a long filename. The long filename directory entries 20 are dynamically allocated based upon the number of characters in the long filename. For example, a file with a long filename of 50 characters has two long filename directory entries 20 allocated for it, whereas a file with a long filename of 70 characters has three long filename directory entries 20 allocated for it. As was mentioned above, a long filename may have a maximum of 255 characters and thus, a maximum of 10 long filename directory entries 20 may be allocated for any file. The maximum of 255 characters per filename is a product of maximum path length (260 characters) limitations of the operating system 17.

There may be many instances in which the long filename does not completely fill all of the space available in the allocated long filename directory entries 20. In such an instance, a null terminator is placed after the last character of the long filename so that additional spaces or nonsensical data will not be returned. The extra spaces are filled with 0FFh (where "h" indicates the use of hexadecimal notation).

Figure 3A:
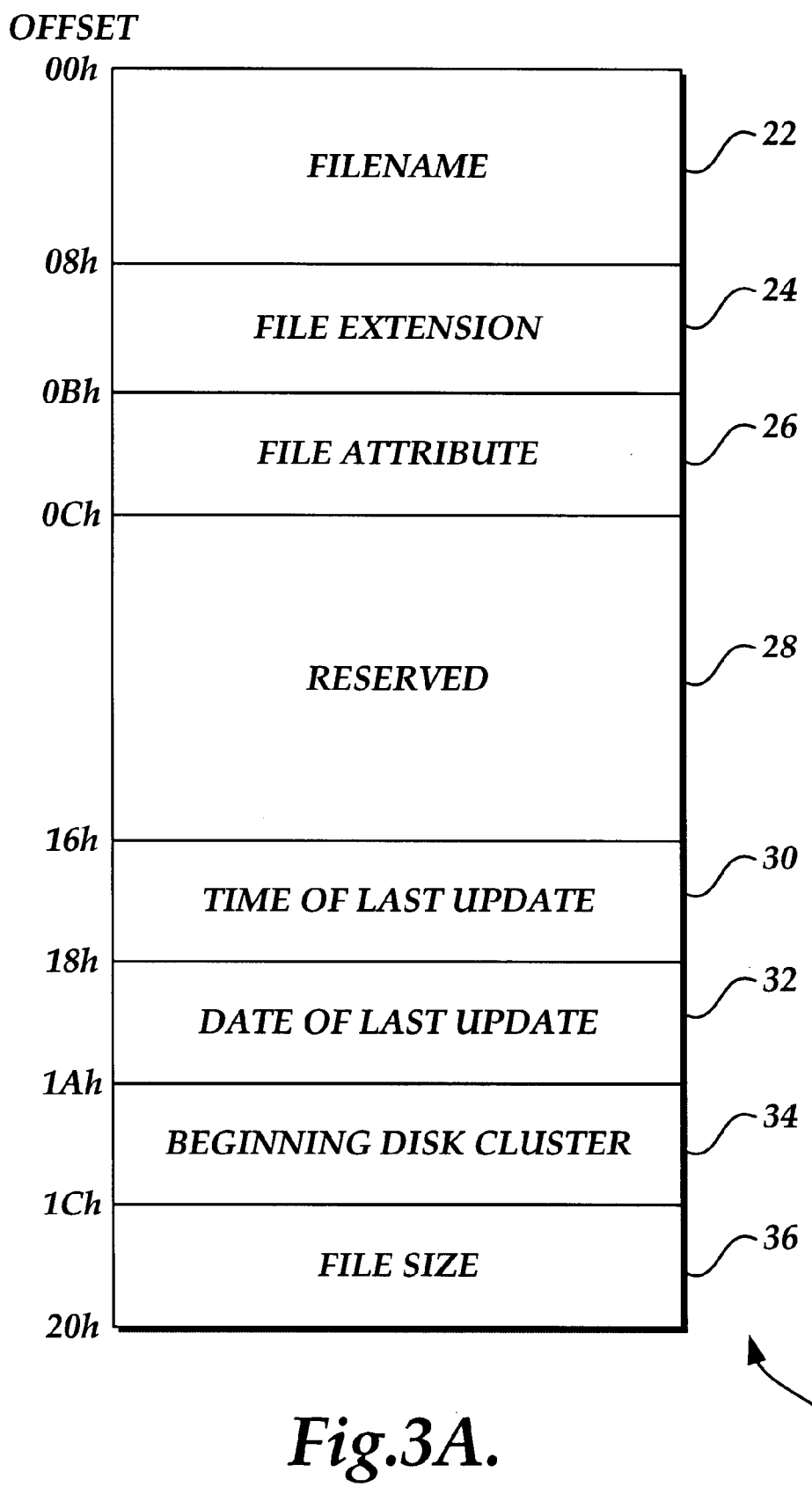
FIG. 3a shows the format of a short filename directory entry in the preferred embodiment of the present invention.

FIG. 3a illustrates the format of the short filename directory entry 18. Each of the fields in the directory entry begins at a different offset relative to the starting address of the directory entry. A filename field 22 holds the main portion (i.e., the leading 8 characters) of the short filename. As the main portion of the short filename may hold up to eight characters of the short filename, the filename field 22 is eight bytes in length and begins at offset 00h. The filename field 22 is followed by a file extension field 24 at offset 08h. The file extension field holds the characters of the extension of the short filename. The extension field 24 is three bytes in length (encoding three characters).

Following the extension field 24 at offset 0Bh is a file attributes field 26. The file attributes field 26 includes a number of bits that, based upon whether the bits are set or not, specify information about the associated file.

The short filename directory entry 18 also includes a reserved field 28. The reserved field 28 begins at offset 0Ch and is ten bytes in length. The short filename directory entry 18 additionally includes a time of last update field 30 and a date of last update field 32. The time of last update field 30 is two bytes in length and begins at offset 16h. The date of last update field 32 is two bytes in length and begins at offset 18h.

The short filename directory entry 18 includes a beginning disk cluster field 34. The beginning disk cluster field 34 holds a pointer to the section of the memory 16 (FIG. 1) where the file's first disk cluster is held (i.e. to the beginning of the allocation chain for the file). This beginning disk cluster field 34 (FIG. 3a) is stored at offset 1Ah and is two bytes in length. A file size field 36 follows the beginning disk cluster field 34. The file size field 36 holds a value that specifies the amount of memory occupied by the file associated with the short filename directory entry 18. The file size field 36 is four bytes in length and begins at offset 1Ch.

Figure 3B:
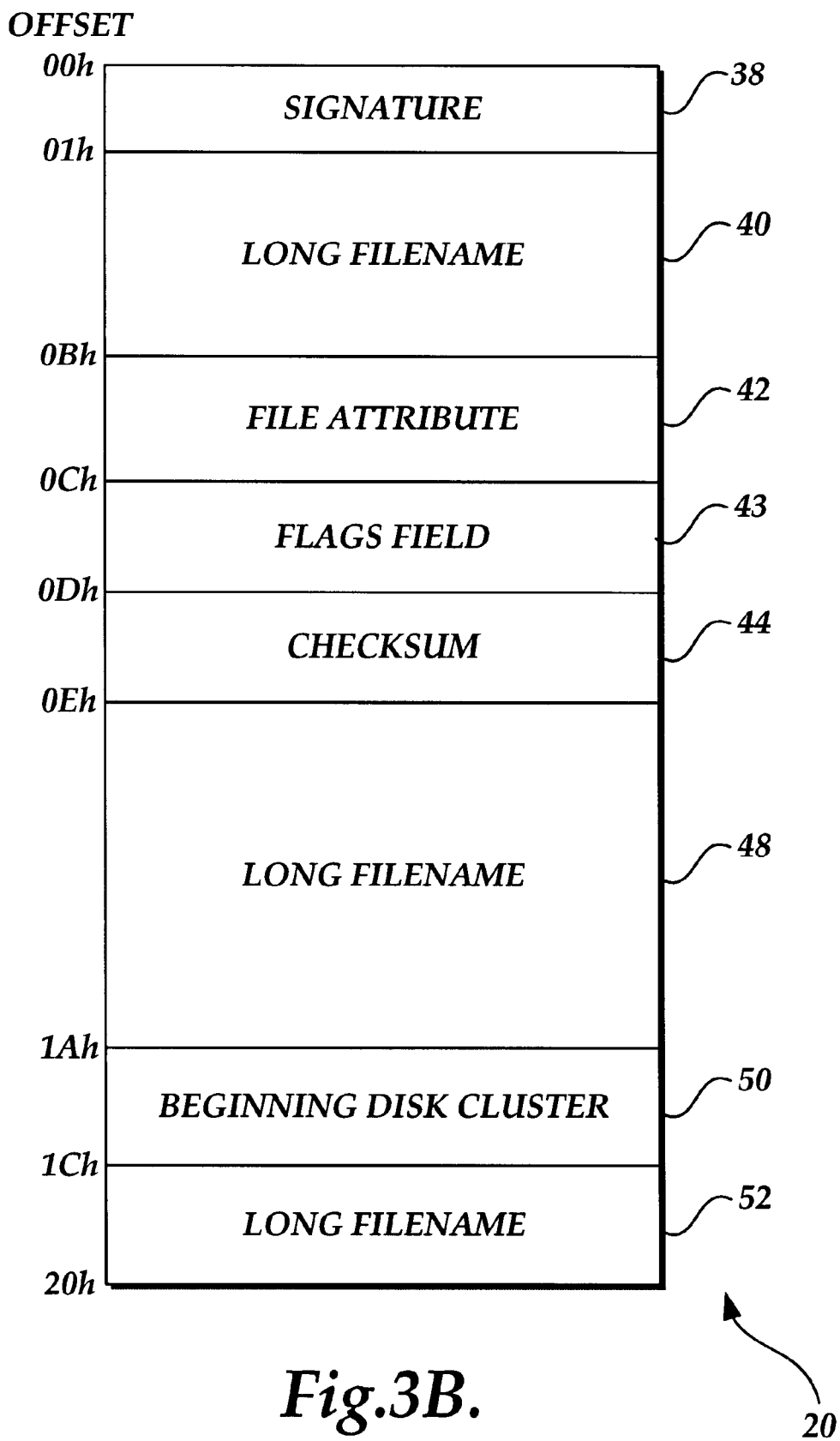
FIG. 3b shows the format of a long filename directory entry in the preferred embodiment of the present invention.

FIG. 3b illustrates the format used for each of the long filename directory entries 20. The long filename directory entry 20 additionally includes a signature field 38 that holds a digital signature. The signature field 38 is useful in specifying the order of a long filename directory entry 20 in a sequence of associated long filename directory entries. For example, a first long filename directory entry includes a signature field 38 that specifies that it is the first entry, and each successive long filename directory entry includes a signature field 38 that specifies where the long filename directory entry fits in the sequence of long filename directory entries for a file. The signature field 38 is provided primarily for use with utility programs that directly access the file system volume. The signature field 38 is one byte in length and begins at offset 00h, which is the beginning of the filename field 22 (FIG. 3a) of the short filename directory entry 18. The signature field 38, given its location in the long filename directory entry, might easily be mistaken for a portion of a short filename by certain utility programs. Hence, the signature field 38 includes only illegal short filename characters so that the characters may not be readily changed by systems or utilities that support only short filenames.

The long filename directory entry 20 includes three fields 40, 48 and 52 that are provided for holding characters of the long filename. The first long filename field 40 begins at offset 01h and may hold up to ten characters of the long filename (i.e., it is 10 bytes in length). The second long filename field 48 begins at offset 0Eh and may hold up to twelve characters (i.e., 12 bytes) of the long filename. Lastly, the third long filename field 52 begins at offset 1Ch and may hold up to four characters (i.e., 4 bytes) of the long filename. Thus, cumulatively, these three fields 40, 48 and 52 may hold up to twenty-six characters of the long filename. The long filename fields 40, 48 and 52 are filled sequentially beginning with field 40 and then filling fields 48 and 52, consecutively.

While the long filename directory entry 20 differs from the short filename directory entry 18, the long filename directory entry 20, nevertheless, includes certain similar fields at the same specified offsets as were discussed above for the short filename directory entry 18 (FIG. 3a). As such, operating systems that do not support long filenames are not disturbed by the long filename directory entries 20. For instance, the long filename directory entry 20 includes a file attributes field 42 which is like the file attributes field 26 (see FIG. 3a) provided in the short filename directory entry.

The long filename directory entry 20 contains a checksum field 44, which is one byte in length and at offset 0Dh. The checksum field 44 holds a checksum of the short filename. The checksum byte, as will be described in more detail below, is used to ensure that the long name is valid for the associated short filename and to act as a pointer to the short filename directory entry 18 that is helpful to disk utility programs. A flags field 43 is held at offset 0Ch. The flags field 43 holds a flag bit that may be set when unicode characters are used.

In addition, the beginning disk cluster field 50 (FIG. 3b) of the long filename directory entry 20 is analogous to the beginning disk cluster field 34 (FIG. 3a) of the short filename directory entry 18. However, it always has a constant value of zero in the long filename directory entry.

The above discussion has focused on how the directory entries 18 and 20 (FIG. 2) are used to support both long filenames and short filenames. The discussion below will focus on how such directory entries are supported by the preferred embodiment of the present invention.

Figure 4:
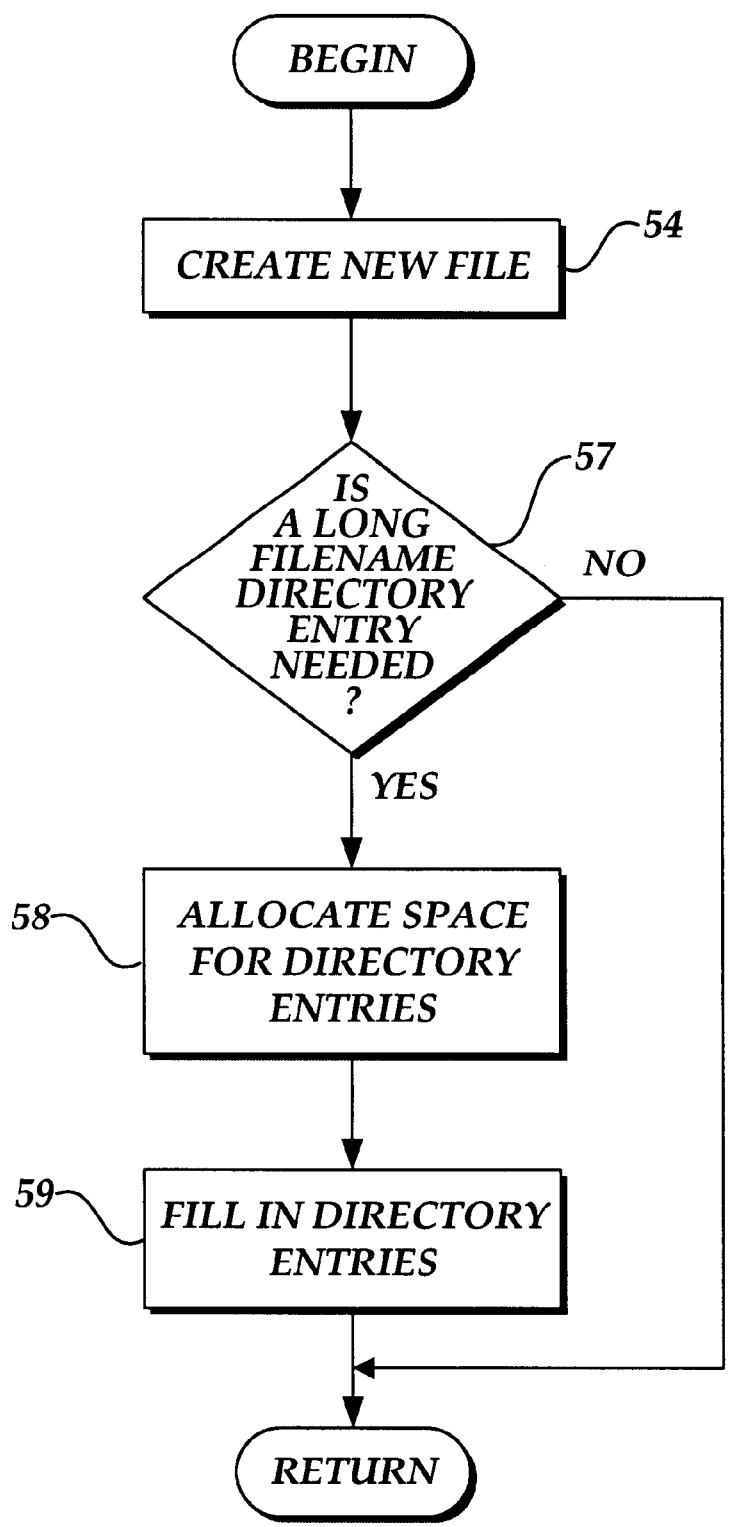
FIG. 4 is a flow chart illustrating the steps performed by the preferred embodiment of the present invention when a new file is created.

When a new file is created, the preferred embodiment must take steps to support both a long filename and a short filename for the new file. In discussing how the preferred embodiment supports both long filenames and short filenames, it is helpful to first focus on the creation of the directory entries and then to focus on the creation of the filenames. FIG. 4 is a flowchart depicting the basic steps performed upon creation of the new file. Initially, the new file is created (step 54) using either a long filename API or a short filename API. Both varieties of APIs support the creation of files. Depending on the type of API that is used to create the files, the file will initially have a long filename and/or a short filename. In other words, if a file is created with a long filename API, it will initially have a long filename and if a file is created with a short filename API, it will initially have a short filename, which may also be the long filename for the file.

At least one long filename directory entry 20 may be created for the file. First, a determination is made whether a long filename directory entry 20 is required (step 51). If the long filename will not correctly fit in the short filename directory entry 18, a long filename directory entry 20 is required. Long filename directory entries 20 are dynamically allocated based upon the number of characters in the long filename. At a minimum, a short filename directory entry 18 will be created that has the format that is shown in FIG. 3a. Thus, the system checks to see how many long filename directory entries are needed and allocates space for the short filename directory entry and as many additional long filename directory entries as are required (step 58). It should be appreciated that when both a short filename directory entry 18 and at least one long filename directory entry 20 are created, space for both types of directory entries are allocated together at the same time. The long and short filename directory entries 18 and 20 are then filled in step 59. However, if no long filename directory entry is required, no space will be allocated (i.e., steps 58 and 59 are skipped).

Figure 5A:
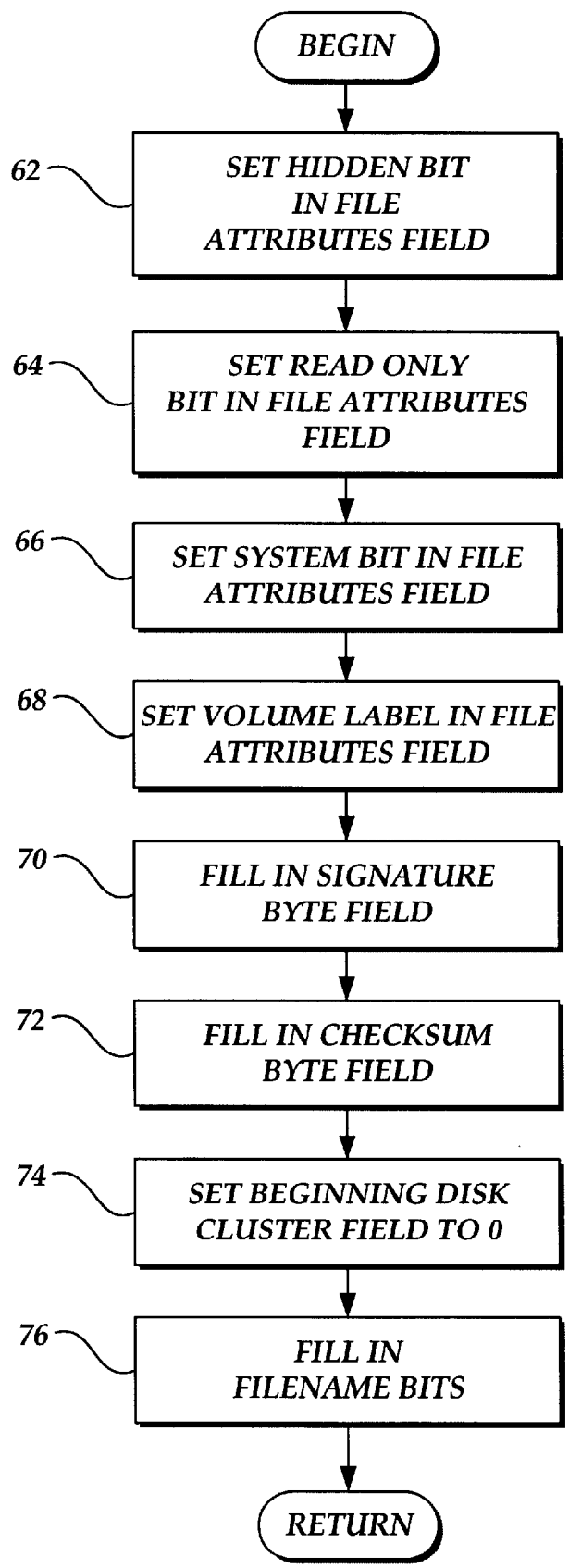
FIG. 5a is a flow chart illustrating the steps performed in creating a long filename directory entry in the preferred embodiment of the present invention.

FIG. 5a is a flowchart depicting the steps performed in filling in a long filename directory entry 20 (see step 59 in FIG. 4). The steps are shown in a given sequence, but those skilled in the art will appreciate that the steps need not be performed in this illustrated sequence. Rather, other sequences are equally acceptable.

Figure 5B:
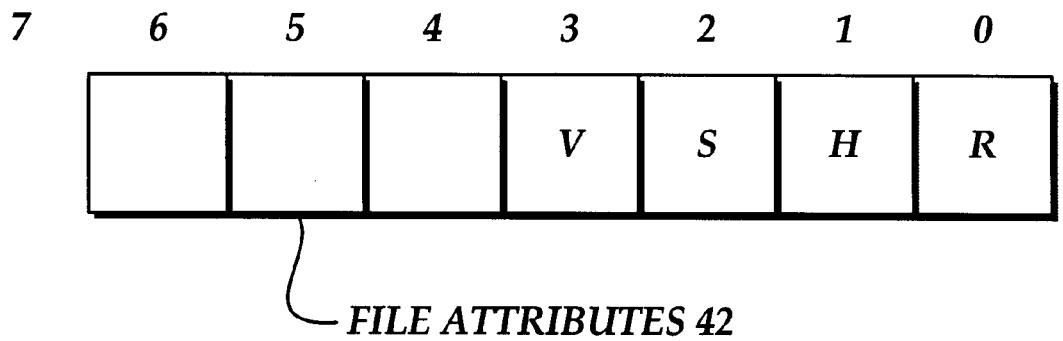
FIG. 5b is a block diagram illustrating bits in the file attributes fields of the long filename directory entry of FIG. 3b.

A hidden bit in the file attributes field 42 is set to have a value of one (step 62). FIG. 5b shows the bits included in the file attributes field 42. The hidden bit is designated by the letter "H" in FIG. 5b and is present at bit position 1 in the file attributes field 42. When the hidden bit is set to a value of one, the directory entry is hidden and is excluded from normal searches of the directory entries 18 and 20. By setting the hidden bit, the long filename directory entries 20 (FIG. 2) are not searched in conventional directory entry searches. The hidden bit is set so that down level systems (i.e., systems that support only short filenames) will not see the long filename directory entries 20.

A read-only bit is also set in the file attributes field (step 64 in FIG. 5a). The read-only bit is designated by the letter "R" in FIG. 5b and is present at bit position 0 in the file attributes field 42. Setting the read-only bit to a value of one indicates that the file is a read-only file and any attempts to write to the file will fail.

A system bit in the file attributes field 42 is set to a value of one (step 66 in FIG. 5a). The system bit is designated by the letter "S" in FIG. 5b and is present at bit position 2 in the file attributes field 42. Setting the system bit to a value of one designates the file as a system file and excludes the directory entry from normal searches of the directory entries 18 and 20. The setting of the system bit to a value of one hides the long filename directory entries 20 from down level operating systems that support only short filenames.

Next, a volume label bit is set in the file attributes field 42 (step 68 in FIG. 5a). The volume label bit is designated by the letter "V" in FIG. 5b and is present at bit position 3 in the file attributes field 42. Setting the volume label bit to a value of one hides the long filename directory entry from "Check Disk" operations of certain disk utility programs. For example, MS-DOS, version 5.0, includes a utility named CHKDSK. The setting of the volume label attribute hides the long filename directory entries from CHKDSK.

The discussion will now return again to the flowchart of FIG. 5a. The signature byte field 38 (FIG. 3b) is filled with a digital signature (step 70 in FIG. 5a). As was mentioned above, the signature distinguishes the order of the long filename directory entries 20 for the file. The checksum field 44 in FIG. 3b is filled with the appropriate checksum of the short filename (step 72 in FIG. 5a). The checksum byte field 44 (FIG. 3b) is used to associate the long filename directory entries 20 with their appropriate short filename by holding a checksum of the short filename. The beginning disk cluster field 50 (FIG. 3b) is set to zero (step 74 in FIG. 5a). The long filename directory entry 20, thus, has no data allocated to it. This helps to make the long filename directory entry invisible in down level systems. Lastly, the bits for the characters of the long filename are stored in the appropriate long filename fields 40, 48 and 52 (FIG. 3b) of the long filename directory entry 20 (step 76 in FIG. 5a).

By setting the file attributes field 42 (FIG. 5b) bits as described above and by setting the beginning disk cluster field 50 to zero (FIG. 3b), the preferred embodiment of the present invention makes the long filename directory entries nearly invisible to operating systems that support only short filenames (i.e., down level systems). Nevertheless, files with long filenames are still permitted in down level operating systems. The long filename directory entries are not visible in the directory entry listing for down level systems. The combination of bit settings in the file attributes field and the zeroing of the beginning disk cluster field 50 make the long filename directory entries invisible to down level systems. Thus, compatibility problems arising from having long filenames in the down level operating system are minimized. Moreover, utility programs, that may skew the order of directory entries, are not a problem. The signature field 40 (FIG. 3b) and the checksum field 44 may be used in conjunction to rearrange entries that are out of order. In particular, the checksum fields 44 are used to associate long filename directory entries 20 with a short filename directory entry and the signature fields 40 of the long filename directory entries are used to assign related long filename directory entries into proper sequence.

Figure 6A:
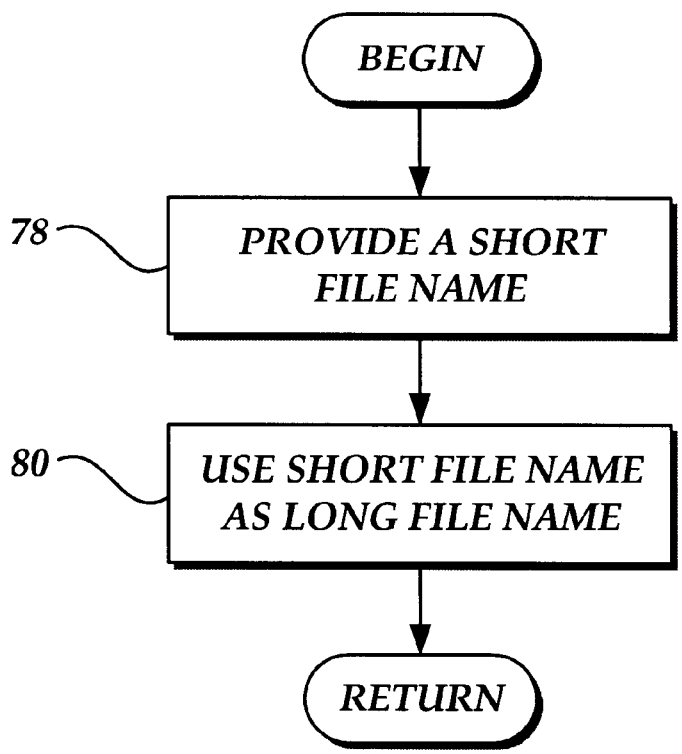
FIG. 6a is a flow chart illustrating the steps performed when a short filename is provided by the user in the preferred embodiment of the present invention.

The discussion above has noted that filenames are created using either short filename APIs or long filename APIs. As a result, when a file is created it has either a long filename or short filename assigned to it by the user, depending on whether a long filename API or short filename API is used. The preferred embodiment of the present invention described herein automatically creates the missing short filename or long filename. For instance, if a file is created using a short filename API, the preferred embodiment described herein establishes a corresponding long filename (which is the same as the short filename). Analogously, if a file is created using a long filename API, the preferred embodiment generates a corresponding short filename that is stored in a short filename directory entry 18. FIG. 6a shows the steps performed by the preferred embodiment when the short filename is provided by the user. In particular, the user provides a short filename (step 78 in FIG. 6a), and the short filename is used as the long filename (step 80). When the user provides a short filename, the system checks whether the name is a valid short filename and whether there are any existing files that pose a conflict (not shown). If there is no problem in terms of format or conflict, the file is assigned the provided short filename. The short filename is then used as the long filename, and there is no long filename directory entry 20 for the file.

Figure 6B:
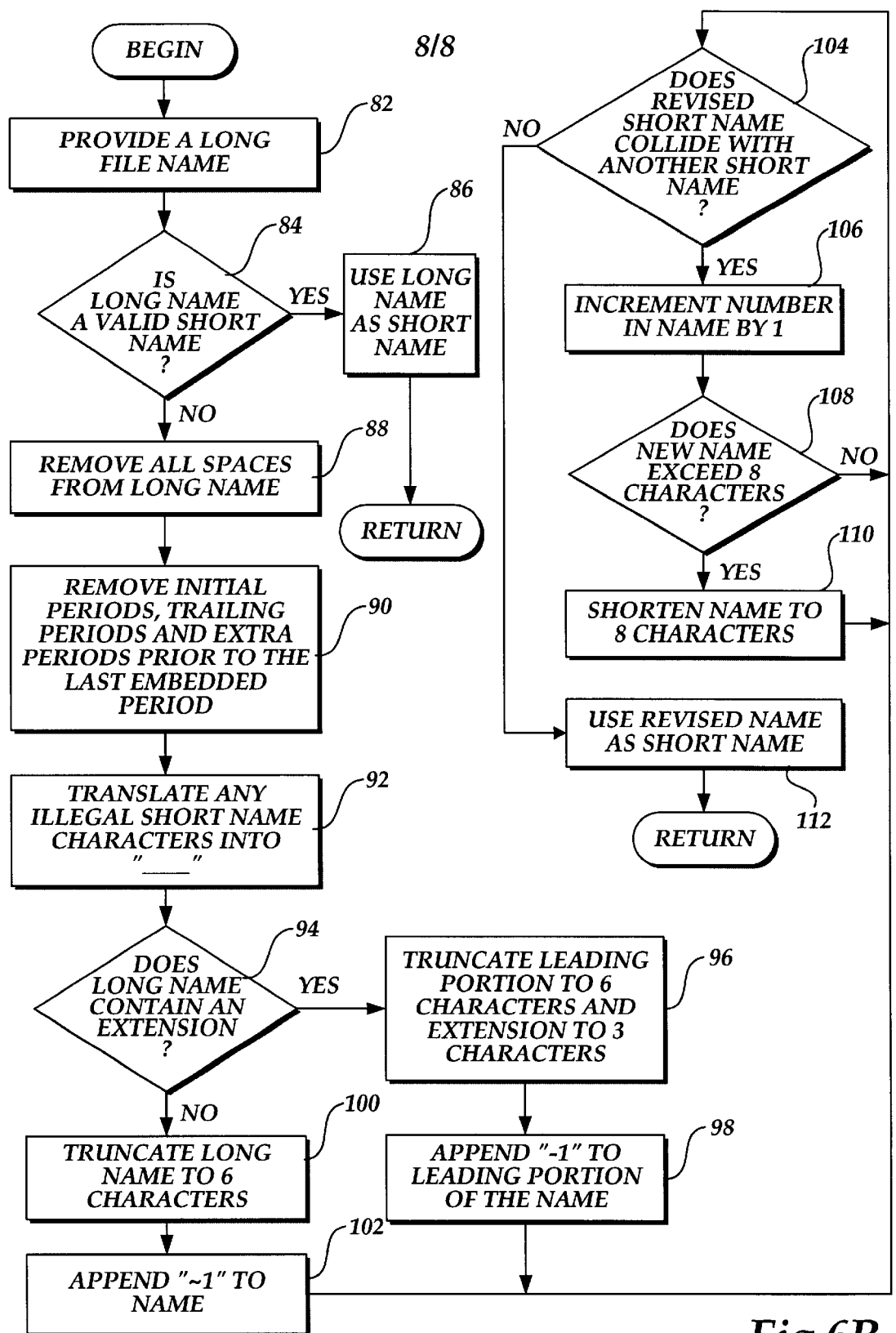
FIG. 6b is a flow chart illustrating the steps performed when a long filename is provided by user in the preferred embodiment of the present invention.

When a file is created using a long filename API, the resulting creation of a corresponding short filename may be quite complex. FIG. 6b is a flowchart illustrating the steps performed to create the short filename in such an instance. Initially, the long filename is provided by the user (step 82 in FIG. 6b). The preferred embodiment then checks whether the long filename is a valid short filename (step 84). If the long filename is a valid short filename, the long filename is used as the short filename (step 86).

However, if the long filename does not qualify as a valid short filename, a short filename is created by removing the spaces from the long filename and using the resulting characters as a proposed short filename (step 88). Initial periods, trailing periods and extra periods that are prior to the last embedded period are then removed from the proposed short filename (step 90). Furthermore, any illegal short filename character is translated into an underscore (step 92). A check of whether the proposed short filename contains an extension is then performed (step 94). If the proposed short filename contains an extension, the leading main portion of the filename is truncated to six characters in length, and the leading three characters of the extension are used (step 96). Subsequently, a "~1" is appended to the leading portion of the remaining characters (step 98) to serve as the short filename.

If the modified long filename does not contain an extension (step 94), the long filename is truncated to six characters (step 100), and "~1" is appended to the truncated filename (step 102) to serve as the short filename. In both of the above-described instances (i.e., the "yes" instance and "no" instance of step 94), the preferred embodiment next checks whether the proposed short filename collides with any other short filename (step 104). If the proposed short filename does not collide with another short filename (i.e., there is no other identical short filename), the proposed short filename is assigned as the short filename for the file (step 112). In the case where the proposed short filename collides with another short filename, the characters that are appended to the name are incremented by one (step 106). Thus, if the number value is initially "~1", the number value is incremented in step 106 by one to "~2". The preferred embodiment checks whether the new proposed short filename exceeds eight characters in length (step 108). If the new proposed short filename does not exceed eight characters in length, the checking of whether the proposed short filename collides with another short filename is repeated (step 104). When the number of characters in the filename exceeds eight characters in length, the new short filename is shortened to eight characters (step 110). In particular, if the length of the leading portion of the filename (ignoring the extension) plus the tilda and the number exceeds eight characters, the leading portion of the filename is shortened until the new proposed short filename (absent the extension) fits in eight characters. For example, the filename "MonKey~10.EXE" is shortened to "MonKe~10.EXE." The above-described steps 104, 106, 108 and 110 are repeated until a short filename is created for the file that is of proper length and that does not collide with another short filename.

The preferred embodiment of the present invention provides a solution to the problem of short filenames while minimizing the compatibility impact of the solution. The use of a common name space that provides a long filename and a short filename for each file allows the files to be used both with applications that support short filenames and applications that support long filenames.

While the present invention has been described with reference to a preferred embodiment thereof, those skilled in the art will appreciate that various changes in scope and form may be made without departing from the present invention as defined in the appended claims.

Application programming interfaces for supporting the use of long filenames in the preferred embodiment of the present invention are described in more detail below.

LONG FILENAMES

About Long Filenames

MICROSOFT WINDOWS 95 allows users and applications to create and use long names for their files and directories. A long filename is a name for a file or directory that exceeds the standard MS-DOS 8.3 filename format. In the past, long filenames typically appeared on network servers that used file systems other than the MS-DOS file allocation table (FAT) file system. For Windows 95, however, long filenames are available for use with network servers and with local disk drives supporting the protected-mode FAT file system. This article describes the long filename functions and explains how to create and use long filenames in MS-DOS and 16-bit WINDOWS 3.x applications. Win32 applications automatically have access to long filenames through the use of the corresponding Win32 file management functions.

Long Filenames and the Protected-Mode FAT File System

The protected-mode FAT file system is the default file system used by WINDOWS 95 for mass storage devices, such as hard and floppy disk drives. Protected-mode FAT is compatible with the MS-DOS FAT file system, using file allocation tables and directory entries to store information about the contents of a disk drive. Protected-mode FAT also supports long filenames, storing these names as well as the date and time the file was created and the date the file was last accessed in the FAT file system structures. The protected-mode FAT file system allows filenames of up to 256 characters, including the terminating null character. In this regard, it is similar to the WINDOWS NT file system (NTFS), which allows filenames of up to 256 characters. Protected-mode FAT allows paths of up to 260 characters, including the drive letter, colon, leading backslash, and terminating null character.

When an application creates a file or directory that has a long filename, the system automatically generates a corresponding alias name for that file or directory using the standard MS-DOS 8.3 filename format. The characters used in the alias name are the same characters that are available for use in MS-DOS file and directory names. Valid characters for the alias name are any combination of letters, digits, or characters with ASCII codes greater than 127, the space character (ASCII 20h), as well as any of the following special characters.

$%'-_@~'!(){}#&

The space character (ASCII 20h) has been available to applications for filenames and directory names through the functions in current and previous versions of MS-DOS. However, many applications do not recognize the space character as a valid character, and the system does not use the space character when it generates an alias name for a long filename. MS-DOS does not distinguish between uppercase and lowercase letters in filenames and directory names, and this is also true for alias names. The set of valid characters for long filenames includes all the characters that are valid for an alias name as well as the following additional characters.

+,;=[]

WINDOWS 95 preserves the case of the letters used in long filenames. However, the Protected-mode Fat file system will not allow more than one file in the same directory with names that are the same except for the case of the letters. For example, files named Long File Name and long file name are not allowed to exist in the same directory. Although extended ASCII characters (characters with ASCII codes greater than 127) are also permitted in filenames, programs should avoid them, because the meanings of the extended characters may vary according to code page. On disk, the characters in the alias name are stored using the OEM character set of the current code page and the long filename is stored using Unicode.

Although the protected-mode FAT file system is the default file system under WINDOWS 95, it is not the only file system accessible to applications running under WINDOWS 95. For example, applications that connect to network drives may encounter other file systems, such as NTFS. Before using long filenames for files and directories on a volume in a given drive, you must determine the maximum lengths of filenames and paths by using Get Volume Information (Interrupt 21h Function 71A0h). The function returns values that you can use to make sure your filenames and paths are within the limits of the file system.

In general, you should avoid using static buffers for filenames and paths. Instead, you should use the values returned by Get Volume Information to allocate buffers as you need them. If you must use static buffers, reserve 256 characters for filenames and 260 characters for paths. These are the maximum sizes currently recommended for Win32 applications.

Filename Aliases

When an application creates a file or directory that has a long filename, the system automatically generates a corresponding alias name for that file or directory, using the standard MS-DOS 8.3 filename format. Filename aliases ensure that existing applications that do not handle long filenames can, nevertheless, access these files and directories.

If the long filename follows the standard 8.3 format, the alias name has the same name except that all lowercase letters are converted to uppercase. For example, if the long filename is Examples.Txt, the corresponding alias name will be EXAMPLES.TXT.

If the long filename does not follow the standard 8.3 format, the system automatically generates an alias name, using the following scheme to ensure that the alias has a unique name. If the long filename does not have an extension, the default alias name is the first 8 characters of the long filename. If the long filename has an extension, the default alias name is the first 8 characters of the long filename and the first 3 characters of the long filename's extension. For example, the alias name for Long File Name is LONGFILE, and the alias name for Long File Name.File is LONGFILE.FIL.

If a file with the same name as the default alias already exists in the directory, the system tries to create a name by using the first 6 characters of the long filename followed by a numeric tail. A numeric tail consists of the tilde (~) character followed by a number. The system starts with the number 1 in the numeric tail. If that filename already exists, it uses the number 2. It continues in this fashion until a unique name is found. As the number of digits in the numeric tail grows, fewer characters in the long filename are used for the 8 characters in the alias name. For example, an alias name for Long File Name.File would be LONGF~10.FIL if the names LONGFILE.FIL and LONGFI~1.FIL through LONGFI~9.FIL already existed in the directory. Applications can override the default alias name numbering scheme when creating a file by specifying the OPEN_FLAGS_ALIAS_HINT flag and supplying a number to use in calls to Create or Open File (Interrupt 21h Function 716Ch).

In a given directory, the long filename and its alias must uniquely identify a file. For example, if there is a file with the name Long File Name and the alias LONGFILE, the system will not allow either Long File Name or LONGFILE to be used as another file's long filename.

If a file with a long filename is copied or edited, the alias name for the resulting file may be different from the original alias name. For example, if the destination directory contains an alias name that conflicts with the original alias name, the system generates another unique alias. If a file with the name LongFileName is associated with an alias LONGFI~2 and is later copied to a different directory using the long filename, the alias name in the destination directory might be LONGFILE (unless a file with that name already existed in the destination directory). The system always generates new aliases during these operations and always chooses aliases that do not conflict with existing filenames. An application must never rely on an alias being the same for all copies and versions of a given file.

Applications can open, read, and write from a file using the alias name without affecting the long filename. However, some operations on the alias, such as copy, backup, and restore, may result in the original long filename being destroyed. Older versions of utilities that do not support long filenames can destroy the long filename while performing those operations.

The system attempts to preserve a long filename even when the file associated with it is edited by an application that is not aware of long filenames. Typically, these applications operate on a temporary copy of the file, and when the user elects to save the file, the application deletes the destination file or renames it to another name. The application then renames the temporary file to the destination name or creates a new file with new contents.

When an application makes a system call to delete or rename an alias name, the system first gathers and saves a packet of information about the file and then performs the delete or rename operation. The information saved includes the long filename as well as the creation date and time, the last modification date and time, and the last access date of the original file. After the system performs the delete or rename operation, the system watches for a short period of time (the default is 15 seconds), to see if a call is made to create or rename a file with the same name. If the system detects a create or rename operation of a recently deleted alias, it applies the packet of information that it had saved to the new file, thus preserving the long filename.

Currently, Load and Execute Program (Interrupt 21h Function 4B00h) does not accept long filenames. If an application starts other applications, it must retrieve the filename alias for the given executable file and pass that alias to Load and Execute Program.

File and Directory Management

The standard MS-DOS file and directory management functions do not accept long filenames. You must, therefore, use the long filename functions to create and manage files and directories having long names. The long filename functions are similar to existing MS-DOS system functions. You copy function parameters to registers and issue an Interrupt 21h instruction to carry out the call. The function sets or clears the carry flag to indicate whether the operation was successful and may also return information in registers.

If a long filename function has a corresponding MS-DOS function, the number that identifies the long filename function is four digits long, beginning with the number 71 and ending in the same number as the corresponding MS-DOS function. For example, the long filename version of Create Directory is Interrupt 21h Function 7139h, and the MS-DOS version of Create Directory is Interrupt 21h Function 39h.

You can create or open a file having a long filename by using Create or Open File (Interrupt 21h Function 716Ch). This function takes the name and attributes of the file to create or open and returns a handle that you use to identify the file in subsequent calls to standard MS-DOS functions, such as Read File or Device (Interrupt 21h Function 3Fh) and Write File or Device (Interrupt 21h Function 40h).

You can set or retrieve the time and attributes for a file having a long filename by using Get or Set File Time (Interrupt 21h Function 57h) and Get or Set File Attributes (Interrupt 21h Function 7143h). You can move a file having a long filename by using Move File (Interrupt 21h Function 7156h) or delete the file by using Delete File (Interrupt 21h Function 7141h).

You can create a directory having a long filename by using Create Directory (Interrupt 21h Function 7139h) or remove the directory by using Remove Directory (Interrupt 21h Function 713Ah).

You can set and retrieve the current directory by using Set Current Directory (Interrupt 21h Function 713Bh) and Get Current Directory (Interrupt 21h Function 7147h).

File Searches

You can search directories for selected files by using Find First File and Find Next File (Interrupt 21h Functions 714Eh and 714Fh). These functions search for and return information about files having long filenames as well as names in the standard 8.3 format. The functions return information in a WIN32_FIND_DATA structure, which contains both the filename and the corresponding alias name (if any).

Unlike MS-DOS Find First File (Interrupt 21h Function 4Eh), the long filename version of Find First File allocates internal storage for the search operations and returns a handle that identifies that storage. This handle is used with Find Next File. To make sure this internal storage is freed, you must use Find Close (Interrupt 21h Function 71A1h) to end the search.

You pass the functions Delete File (Interrupt 21h Function 7141h) and Find First File a filename, which may contain the wildcard characters, such as the asterisk (*) and question mark (?). Because Find First File, Find Next File, and Delete File examine long filenames and alias names during the search, some wildcard searches may yield unexpected results. For example, if the system has generated the alias LONGFI~1 for the long filename LongFileName, a search for names that match the pattern *1 always returns the LongFileName file, even though that name does not end with a 1. Searches are not case-sensitive. For example, a search for names that match the pattern *mid* will yield the same results as the pattern *MID*. In general, you should check both names returned in the WIN32_FIND_DATA structure to determine which matched the pattern.

Wildcard searches are more flexible in WINDOWS 95 than in MS-DOS. Note that in the above examples, *1 finds the filenames that end in a 1 and *mid* finds filenames that contain the characters mid. In MS-DOS and in WINDOWS 95 searching on real-mode FAT directories, all characters after the first * are ignored.

Down-Level Systems Long filenames, file last access date, and file creation date and time are not supported while the file system is in WINDOWS 3.1 Compatibility Mode or in Single MS-DOS Application Mode, or on versions of MS-DOS that only support the real-mode FAT file system. These file systems and others that do not support long filenames are referred to as down-level systems. If you intend to run an application under both WINDOWS 95 and down-level systems, you should always check the system to determine whether it supports the long filename functions. The easiest way to check is to call Get Volume Information (Interrupt 21h Function 71A0h). This function returns an error if the system does not support the long filename functions.

Another way of handling down-level systems is to use a combination of calls to long filename and standard MS-DOS functions to carry out file management. In this case, you call the standard function only if the long filename function is not supported. To indicate an unsupported function, the system sets the AL register to 0 but leaves the AH register and the carry flag unchanged. The following example shows how to combine long filename and standard functions to carry out a file or directory management operation.

```
stc                  ; set carry for error flag
                     ; set registers here for the LFN function call
int 21h              ; call the long filename function
jnc success          ; call succeeded, continue processing
cmp ax, 7100h        ; is the call really not supported?
jne failure          ; yes, supported, but an error occurred
                     ; set registers here for the MS-DOS function call
int 21h              ; call the standard MS-DOS function
```

Application developers have to decide what to do when users save a file with a long filename to a down-level system. One approach is to imitate the behavior of COMMAND.COM and save the file using the alias name without informing the user. A different approach is to have the application inform the user that the file system does not support long filenames and allow the user to save the file with name in the standard 8.3 format.

Long Command Lines

The limit for environment variables and batch file lines in WINDOWS 95 is 1024 characters, whereas in previous versions of MS-DOS the limit is 128 characters. The limit for the keyboard buffer is still 128 characters. Although 1024 and 128 are the default values, users may configure their systems to lower these limits.

In previous versions of MS-DOS, command-line arguments are located in the command tail of the program segment prefix (PSP). The command tail in the PSP is limited to 128 characters, including the leading byte that specifies the length of the command line and the trailing carriage return character. In WINDOWS 95, if the command line is less than or equal to 126 characters, it is set in the command tail of the PSP. If the command line is greater than 126 characters, the command line is set in the CMDLINE environment variable, and the command tail in the PSP just contains a carriage return character.

Last Access Date

The WINDOWS 95 last access date is intended to reflect the last time a file was accessed for the purpose for which it was created. This date is intended to provide a means for applications, users, or both to determine which files have not been used recently. The last access date should not be reset when a file is accessed by a program which has no understanding of its contents. For example, none of the following operations should affect the last access date:

Backing up a file.
  Searching files for strings.
  Scanning for viruses.
  Applications should set the last access date in the following cases:
  Running a program should set the last access date for the .EXE file.
  Loading a dynamic-link library (DLL) should set the last access date for the .DLL file.
  Editing or printing a document should set the last access date for the document file.
  In general, any use of a document by an application that creates or modifies that type of document should set the last access date (unless the document is being opened only to decide whether it is to be used in a find operation).

Application use of peripheral files (.INI files, and so on) should set the last access date.

Win32-based applications can preserve the last access date by using the GetFileTime and SetFileTime functions. Applications written for MS-DOS or WINDOWS 3.x can use Get Last Access Date (Interrupt 21h Function 5704h) and Set Last Access Date (Interrupt 21h Function 5705h), or they can open the file with Create or Open File (Interrupt 21h Function 716Ch) using the OPEN_ACCESS_RO_NOMODLASTACCESS (0004h) access mode.

Long Filename Functions

The long filename functions match the operations provided by the Win32 file management functions.

| Long filename function | Win32 function |
| --- | --- |
| Interrupt 21h Function 5704h Get Last Access Date and Time | GetFileTime |
| Interrupt 21h Function 5705h Set Last Access Date and Time | SetFileTime |
| Interrupt 21h Function 5706h Get Creation Date and Time | GetFileTime |
| Interrupt 21h Function 5707h Set Creation Date and Time | SetFileTime |
| Interrupt 21h Function 7139h Make Directory | CreateDirectory |
| Interrupt 21h Function 713Ah Remove Directory | RemoveDirectory |
| Interrupt 21h Function 713Bh Change Directory | SetCurrentDirectory |
| Interrupt 21h Function 7141h Delete File | DeleteFile |
| Interrupt 21h Function 7143h Get or Set File Attributes | GetFileAttributes, SetFileAttributes |
| Interrupt 21h Function 7147h Get Current Directory | GetCurrentDirectory |
| Interrupt 21h Function 714Eh Find First File | FindFirstFile |
| Interrupt 21h Function 714Fh Find Next File | FindNextFile |
| Interrupt 21h Function 7156h Rename File | MoveFile |
| Interrupt 21h Function 7160h Get Full Path Name | GetFullPathName |
| Interrupt 21h Function 7160h Get Short Path Name | GetShortPathName |
| Interrupt 21h Function 716Ch Get Long Path Name | No Win32 function equivalent. |
| Interrupt 21h Function 716Ch Create or Open File | CreateFile, OpenFile |
| Interrupt 21h Function 71A0h Get Volume Information | GetVolumeInformation |
| Interrupt 21h Function 71A1h Find Close | FindClose |
| Interrupt 21h Function 71A6h Get File Info By Handle | GetFileInformationByHandle |
| Interrupt 21h Function 71A7h File Time To DOS Time | FileTimeToDOSDateTime |
| Interrupt 21h Function 71A7h DOS Time To File Time | DOSDateTimeToFileTime |

Note that Interrupt 21h Functions 71A2h through 71A5h exist, but they are for internal use by WINDOWS 95 only. Also, Extended Open/Create (Interrupt 21h Function 6Ch) has been enhanced in WINDOWS 95 to make use of the last access date for a file.

Reference

This section describes the long filename functions and structures.

Functions
Interrupt 21h Function 5704h Get Last Access Date and Functions

```
mov ax, 5704h        ; Get Last Access Date and Time
mov bx, Handle       ; file handle
int 21h
jc error
mov [Date], dx       ; last access date
mov [Time], cx       ; currently not supported, always 0
```

Retrieves the last access date for the given file.

If successful, clears the carry flag and sets the CX register to 0 and the DX register to these values:

| Bits | Contents |
| --- | --- |
| 0–4 | Day of the month (1–31) |
| 5–8 | Month (1 = January, 2 = February, and so on) |
| 9–15 | Year offset from 1980 (add 1980 to get the actual year) |

Otherwise, sets the carry flag and sets the AX register to an error value.

Handle

File handle. It must have been previously retrieved by using Create or Open File (Interrupt 21h Function 716Ch) or Extended File Open (Interrupt 21h Function 6Ch).

Interrupt 21h Function 5705h Set Last Access Date and Time

```
mov ax, 5705h        ; Set Last Access Date and Time
mov bx, Handle       ; file handle
mov cx, 0            ; time currently not supported, always 0
mov dx, AccessDate   ; new access date
int 21h
jc error
```

Sets the last access date for the given file.

If successful, clears the carry flag. Otherwise, sets the carry flag and sets the AX register to an error value.

Handle

File handle. It must have been previously retrieved by using Create or Open File (Interrupt 21h Function 716Ch) or Extended File Open (Interrupt 21h Function 6Ch).

AccessDate

New access date. The access date is a packed 16-bit value with the following form:

| Bits | Contents |
| --- | --- |
| 0–4 | Day of the month (1–31) |
| 5–8 | Month (1 = January, 2 = February, and so on) |
| 9–15 | Year offset from 1980 (add 1980 to get the actual year) |

Interrupt 21h Function 5706h Get Creation Date and Time

```
mov ax, 5706h        ; Get Creation Date and Time
mov bx, Handle       ; file handle
int 21h
jc error
```

-continued

| | | |
|---|---|---|
| mov [Time], cx | ; creation time | |
| mov [Date], dx | ; creation date | |
| mov [MilliSeconds], si | ; number of 10 ms intervals in 2 seconds | |

Retrieves the creation date and time for the given file.

If successful, clears the carry flag and sets the CX, DX, and SI registers to these values:

| Bits | Contents |
|---|---|
| CX | Creation time. The time is a packed 16-bit value with the following form: |
| 0–4 | Second divided by 2 |
| 5–10 | Minute (0–59) |
| 11–15 | Hour (0–23 on a 24-hour clock) |
| DX | Creation date. The date is a packed 16-bit value with the following form: |
| 0–4 | Day of the month (1–31) |
| 5–8 | Month (1 = January, 2 = February, and so on) |
| 9–15 | Year offset from 1980 (add 1980 to get the actual year) |
| SI | Number of 10 millisecond intervals in 2 seconds to add to the MS-DOS time. It can be a value in the range of 0 to 199. |

Otherwise, sets the carry flag and sets the AX register to an error value.

Handle

File handle. It must have been previously retrieved by using Create or Open File (Interrupt 21h Function 716Ch) or Extended File Open (Interrupt 21h Function 6Ch).

Interrupt 21h Function 5707h Set Creation Date and Time

| | |
|---|---|
| mov ax, 5707h | ; Set Creation Date and Time |
| mov bx, Handle | ; file handle |
| mov cx, Time | ; new creation time |
| mov dx, Date | ; new creation date |
| mov si, MilliSeconds | ; number of 10 ms intervals in 2 seconds |
| int 21h | |
| jc error | |

Sets the creation date and time for the given file.

If successful, clears the carry flag. Otherwise, sets the carry flag and sets the AX register to an error value.

Handle

File handle. It must have been previously retrieved by using Create or Open File (Interrupt 21h Function 716Ch) or Extended File Open (Interrupt 21h Function 6Ch).

Time

New creation time. The new creation time is a packed 16-bit value with the following form:

| Bits | Contents |
|---|---|
| 0–4 | Second divided by 2 |
| 5–10 | Minute (0–59) |
| 11–15 | Hour (0–23 on a 24-hour clock) |

Date

New creation date. The new creation date is a packed 16-bit value with the following form:

| Bits | Contents |
|---|---|
| 0–4 | Day of the month (1–31) |
| 5–8 | Month (1 = January, 2 = February, and so on) |
| 9–15 | Year offset from 1980 (add 1980 to get the actual year) |

MilliSeconds

Number of 10 millisecond intervals in 2 seconds to add to the MS-DOS time. It can be a value in the range 0 to 199.

Interrupt 21h Function 6Ch Extended Open/Create

| | |
|---|---|
| mov ah, 6Ch | ; Extended Open/Create |
| mov bx, ModeAndFlags | ; access and sharing mode and open flags |
| mov cx, Attributes | ; file attributes |
| mov dx, Action | ; action to take |
| mov si, seg Filename | ; address of 8.3 filename |
| mov ds, si | |
| mov si, offset Filename | |
| int 21h | |
| jc error | |
| mov [Handle], ax | ; file handle |
| mov [ActionTaken], cx | ; action taken to open file |

Opens or creates a file having the given name and attributes.

If successful, clears the carry flag, copies the file handle to the AX register, and sets CX to one of these values:

ACTION_OPENED (0001h)

ACTION_CREATED_OPENED (0002h)

ACTION_REPLACED_OPENED (0003h)

Otherwise, sets the carry flag and sets the AX register to one of these error values:

ERROR_INVALID_FUNCTION (0001h)

ERROR_FILE_NOT_FOUND (0002h)

ERROR_PATH_NOT_FOUND (0003h)

ERROR_TOO_MANY_OPEN_FILES (0004h)

ERROR_ACCESS_DENIED (0005h)

ModeAndFlags

Combination of access mode, sharing mode, and open flags. It can be one value each from the access and sharing modes and any combination of open flags:

| Access mode | Meaning |
| --- | --- |

OPEN_ACCESS_READONLY (0000h)
    Opens the file for reading only.
OPEN_ACCESS_WRITEONLY (0001h)
    Opens the file for writing only.
OPEN_ACCESS_READWRITE (0002h)
    Opens the file for reading and writing.
0003h
    Reserved, do not use.
OPEN_ACCESS_RO_NOMODLASTACCESS (0004h)
    Opens the file for reading only without modifying the file's last access date.

| Sharing mode | Meaning |
| --- | --- |

OPEN_SHARE_COMPATIBLE (0000h)
    Opens the file with compatibility mode, allowing any process on a given computer to open the file any number of times.
OPEN_SHARE_DENYREADWRITE (0010h)
    Opens the file and denies both read and write access to other processes.
OPEN_SHARE_DENYWRITE (0020h)
    Opens the file and denies write access to other processes.
OPEN_SHARE_DENYREAD (0030h)
    Opens the file and denies read access to other processes.
OPEN_SHARE_DENYNONE (0040h)
    Opens the file without denying read or write access to other processes but no process may open the file for compatibility access.

| Open flags | Meaning |
| --- | --- |

OPEN_FLAGS_NOINHERIT (0080h)
    If this flag is set, a child process created with Load and Execute Program (Interrupt 21h Function 4B00h) does not inherit the file handle. If the handle is needed by the child process, the parent process must pass the handle value to the child process. If this flag is not set, child processes inherit the file handle.
OPEN_FLAGS_NOCRITERR (2000h)
    If a critical error occurs while MS-DOS is opening this file, Critical-Error Handler (Interrupt 24h) is not called. Instead, MS-DOS simply returns an error value to the program.
OPEN_FLAGS_COMMIT (4000h)
    After each write operation, MS-DOS commits the file (flushes the contents of the cache buffer to disk).

Attributes
    Attributes for files that are created or truncated. They may be a combination of these values:
    FILE_ATTRIBUTE_NORMAL (0000h)
        The file can be read from or written to. This value is valid only if used alone.
    FILE_ATTRIBUTE_READONLY (0001h)
        The file can be read from but not written to or deleted. It can be renamed.
    FILE_ATTRIBUTE_HIDDEN (0002h)
        The file is hidden and does not appear in an ordinary directory listing.
    FILE_ATTRIBUTE_SYSTEM (0004h)
        The file is part of the operating system or is used exclusively by it.
    FILE_ATTRIBUTE_VOLUME (0008h)
        The name specified by Filename is used as the volume label for the current medium.
    FILE_ATTRIBUTE_ARCHIVE (0020h)
        The file is an archive file. Applications use this value to mark files for backup or removal.
Action
    Action to take it the file exists or if it does not exist. It can be a combination of these values:

| | |
| --- | --- |
| FILE_CREATE (0010h) | Creates a new file if it does not already exist. |
| FILE_OPEN (0001h) | Opens the file. The function fails if the file does not exist. |
| FILE_TRUNCATE (0002h) | Opens the file and truncates it to zero length (replaces the existing file). The function fails if the file does not exist. |

The only valid combinations are FILE_CREATE combined with FILE_OPEN or FILE_CREATE combined with FILE_TRUNCATE.
Filename
    Address of a null-terminated string specifying the name of the file to be opened or created. The name must be in the standard MS-DOS 8.3 filename format. The string must be a valid path for the volume associated with the given drive.
    This function does not support long filenames. If the specified name is too long, this function truncates the name to a standard 8.3 format name following the same naming scheme that the system uses when creating an alias for a long filename.
    A file on a remote directory—that is, a directory on the network—cannot be opened, unless appropriate permissions for the directory exist.

Interrupt 21h Function 7139h Make Directory

```
mov ax, 7139h          ; Make Directory
mov dx, seg Name       ; address of directory name
mov ds, dx
mov dx, offset Name
int 21h
jc error
```

Creates a new directory having the given name.

If successful, clears the carry flag. Otherwise, sets the carry flag and sets the AX register to an error value.

Name

Address of a null-terminated string specifying the name of the directory to create. Long filenames are allowed.

Interrupt 21h Function 713Ah Remove Directory

```
mov ax, 713Ah          ; Remove Directory
mov dx, seg Name       ; address of directory name
mov ds, dx
mov dx, offset Name
int 21h
jc error
```

Removes the given directory. The directory must be empty.

If successful, clears the carry flag. Otherwise, sets the carry flag and sets the AX register to an error value.

Name

Address of a null-terminated string specifying the name of the directory to remove. Long filenames are allowed.

The root directory can not be deleted.

Interrupt 21h Function 713Bh Change Directory

```
mov ax, 713Bh          ; Change Directory
mov dx, seg Path       ; address of path for new directory
mov ds, dx
mov dx, offset Path
int 21h
jc error
```

Changes the current directory to the directory specified by the given path.

If successful, clears the carry flag. Otherwise, sets the carry flag and sets the AX register to an error value.

Path

Address of a null-terminated string specifying the directory to change to. The path, which can include the drive letter, must be a valid path for the given volume. Long filenames are allowed.

If a drive other than the default drive is specified as part of the new directory path, this function changes the current directory on that drive but does not change the default drive. Set Default Drive (Interrupt 21h Function 0Eh) can be used to change the default drive.

Interrupt 21h Function 7141h Delete File

```
mov ax, 7141h             ; Delete File
mov dx, seg Filename      ; address of filename
mov ds, dx
mov dx, offset Filename
mov si, WildcardAndAttrs  ; allow wildcards and match attributes
```

```
int 21h
jc error
```

Deletes the given file or files. If the specified filename contains a wildcard character, Delete File can delete multiple files that match the wildcard.

If successful, clears the carry flag. Otherwise, sets the carry flag and sets the AX register to an error value.

Filename

Address of a null-terminated string specifying the name of the file to delete. If WildcardAndAttrs is 1, the "*" and "?" wildcard characters are permitted in the filename. Long filenames are allowed.

WildcardAndAttrs

Search criteria. The high byte must be one of these values:

0  Wildcard characters are not allowed in Filename. The attributes are ignored.
1  Wildcard characters are allowed in Filename. Files with specified attributes are marked.

If the high byte is 1, the low byte must specify the attributes that files must match to be deleted. They can be a combination of these values:

FILE_ATTRIBUTE_NORMAL (0000h)
    The file can be read from or written to. This value is valid only if used alone.
FILE_ATTRIBUTE_READONLY (0001h)
    The file can be read from but not written to or deleted. It can be renamed.
FILE_ATTRIBUTE_HIDDEN (0002h)
    The file is hidden and does not appear in an ordinary directory listing.
FILE_ATTRIBUTE_SYSTEM (0004h)
    The file is part of the operating system or is used exclusively by it.
FILE_ATTRIBUTE_VOLUME (0008h)
    The name specified by Filename is used as the volume label for the current medium. It is not necessary to know the volume label name to delete it. If "*" is specified as the Filename, only this attribute flag, and no others, is used to delete the volume label.
FILE_ATTRIBUTE_ARCHIVE (0020h)
    The file is an archive file. Applications use this value to mark files for backup or removal.

Wildcard searches are more flexible in WINDOWS 95 than in MS-DOS. For example, *1 finds the filenames (both long filenames and aliases) that end in a 1 and *mid* finds filenames that contain the characters mid. In MS-DOS and in WINDOWS 95 searching on real-mode FAT directories, all characters after the first * are ignored.

Interrupt 21h Function 7143h Get or Set File Attributes

```
mov ax, 7143h          ; Get or Set File Attributes
mov bl, Action         ; 0 to get attributes, 1 to set
mov cx, Attributes     ; file attributes (used only if bl is 1)
mov dx, seg Filename   ; address of filename
mov ds, dx
mov dx, offset Filename
int 21h
```

```
jc error
mov [Attributes], cx      ; file attributes if BL was 0
```

Retrieves or sets the file attributes for the given file.

If successful, clears the carry flag, and if the BL register was 0, sets the CX register to a combination of these values:

FILE_ATTRIBUTE_NORMAL (0000h)
FILE_ATTRIBUTE_READONLY (0001h)
FILE_ATTRIBUTE_HIDDEN (0002h)
FILE_ATTRIBUTE_SYSTEM (0004h)
FILE_ATTRIBUTE_VOLUME (0008h)
FILE_ATTRIBUTE_DIRECTORY (0010h)
FILE_ATTRIBUTE_ARCHIVE (0020h)

Otherwise, sets the carry flag and sets the AX register to an error value.

Action

Action to take. It can be 0 to retrieve attributes and 1 to set attributes.

Attributes

File attributes to set. They are used only if Action is 1. They can be a combination of these values:

FILE_ATTRIBUTE_NORMAL (0000h)
   The file can be read from or written to. This value is valid only if used alone.
FILE_ATTRIBUTE_READONLY (0001h)
   The file can be read from but not written to or deleted. It can be renamed.
FILE_ATTRIBUTE_HIDDEN (0002h)
   The file is hidden and does not appear in an ordinary directory listing.
FILE_ATTRIBUTE_SYSTEM (0004h)
   The file is part of the operating system or is used exclusively by it.
FILE_ATTRIBUTE_ARCHIVE (0020h)
   The file is an archive file. Applications use this value to mark files for backup or removal.

Filename

Address of a null-terminated string specifying the name of the file to retrieve or set attributes for. Long filenames are allowed.

Interrupt 21h Function 7147h Get Current Directory

```
mov ax, 7147h             ; Get Current Directory
mov dl, Drive             ; drive number
mov si, seg Buffer        ; address of buffer for path
mov ds, si
mov si, offset Buffer
int 21h
jc error
```

Copies the path of the current directory for the given drive to the buffer. The copied path does not include the drive letter or the leading backslash.

If successful, clears the carry flag and copies the path. Otherwise, sets the carry flag and sets the AX register to an error value.

Drive

Drive number. It can be 0 for current drive, 1 for A, 2 for B, and so on.

Buffer

Address of the buffer that receives the path. The buffer must be at least as big as the maximum allowed path for this volume as returned by Get Volume Information (Interrupt 21h Function 71A0h).

Interrupt 21h Function 714Eh Find First File

```
mov ax, 714Eh             ; Find First File
mov ch, MustMatchAttrs    ; must match attributes
mov cl, SearchAttrs       ; search attributes
mov dx, seg Filename      ; file to search for
mov ds, dx
mov dx, offset Filename
mov di, seg FindData      ; address of WIN32_FIND_DATA struct
mov es, di
mov di, offset FindData
mov si, DateTimeFormat    ; format for returned date and time
int 21h
jc error
mov [Handle], ax          ; search handle
mov [ConversionCode], cx  ; UNICODE to OEM/ANSI conversion ok?
```

Searches a directory for the first file or directory whose name and attributes match the specified name and attributes.

If successful, clears the carry flag, copies information about the file to the specified buffer, returns the search handle in the AX register, and sets the CX register to a combination of these values:

0x0000  All characters in the primary and alternate name members in the structure specified by FindData were successfully converted from UNICODE.
0x0001  The primary name returned in the structure specified by FindData contains underscore characters in place of characters that could not be converted from UNICODE.
0x0002  The alternate name returned in the structure specified by FindData contains underscore characters in place of characters that could not be converted from UNICODE.

Otherwise, sets the carry flag and sets the AX register to an error value.

MustMatchAttrs

An additional filter on the attributes specified in SearchAttrs. It can be a combination of these values:

FILE_ATTRIBUTE_NORMAL (0000h)
   The file can be read from or written to. This value is valid only if used alone.
FILE_ATTRIBUTE_READONLY (0001h)
   The file can be read from but not written to or deleted. It can be renamed.
FILE_ATTRIBUTE_HIDDEN (0002h)
   The file is hidden and does not appear in an ordinary directory listing.
FILE_ATTRIBUTE_SYSTEM (0004h)
   The file is part of the operating system or is used exclusively by it.
FILE_ATTRIBUTE_VOLUME (0008h)
   The name specified by Filename is used as the volume label for the current medium.
FILE_ATTRIBUTE_DIRECTORY (0010h)
   The name specified by Filename is used as a directory, not a file.
FILE_ATTRIBUTE_ARCHIVE (0020h)
   The file is an archive file. Applications use this value to mark files for backup or removal.

SearchAttrs

File attributes to search for. They can be a combination of these values:

FILE_ATTRIBUTE_NORMAL (0000h)

FILE_ATTRIBUTE_READONLY (0001h)
FILE_ATTRIBUTE_HIDDEN (0002h)
FILE_ATTRIBUTE_SYSTEM (0004h)
FILE_ATTRIBUTE_VOLUME (0008h)
FILE_ATTRIBUTE_DIRECTORY (0010h)
FILE_ATTRIBUTE_ARCHIVE (0020h)
Filename Address of a null-terminated string specifying the name of the file or directory to search for. The name, which must be a valid filename or directory name, can include the "*" and "?" wildcard characters. Long filenames are allowed.
FindData Address of a WIN32_FIND_DATA structure that receives information about the file.
DateTimeFormat Date and time format to be returned. It must be one of these values:

| | |
|---|---|
| 0 | Returns the date and time in 64-bit file time format. |
| 1 | Returns the MS-DOS date and time values. |

Find First File and subsequent calls to Find Next File (Interrupt 21h Function 714Fh) use the following algorithm to match the attributes of a file or directory (referred to as Attributes in the algorithm) against MustMatchAttrs and SearchAttrs.

```
if    ((((MustMatchAttrs & ~Attributes) & 0x3F) == 0)
       &&   (((~SearchAttrs & Attributes) & 0x1E) == 0))
{
       return the file or directory name
}
else
{
       continue searching for the next name
}
```

The following table lists the MustMatchAttrs and SearchAttrs values for some common searches where the specified filename is "*.*". In the table, the word normal means that the read only, hidden, or system attributes have not been set. Parentheses are used to indicate that a file or directory has more than one attribute. For example, (hidden and system) indicates that a file or directory has both the hidden attribute and the system attribute.

| MustMatchAttrs | SearchAttrs | Find results |
|---|---|---|
| 10h | 10h | All normal directories |
| 10h | 12h | All normal and hidden directories |
| 10h | 14h | All normal and system directories |
| 10h | 16h | All normal, hidden, system and (hidden and system) directories |
| 12h | 12h | All hidden directories |
| 14h | 14h | All system directories |
| 16h | 16h | All (hidden and system) directories |
| 00h | 00h | All normal files |
| 00h | 01h | All normal and read only files |
| 00h | 02h | All normal and hidden files |
| 00h | 04h | All normal and system files |
| 00h | 06h | All normal, hidden, system, and (hidden and system) files |
| 00h | 10h | All normal files and directories |
| 01h | 01h | All read only files |
| MustMatchAttrs | SearchAttrs | Find results |
| 02h | 02h | All hidden files |
| 02h | 06h | All hidden and (hidden and system) files |

This function can be used to return the volume label by specifying only FILE_ATTRIBUTE_VOLUME (0008h) in both MustMatchAttrs and the SearchAttrs.

An application may use the handle returned in the AX register in subsequent calls to Find Next File (Interrupt 21h Function 714Fh). It is important to close the handle when it is no longer needed by calling Find Close (Interrupt 21h Function 71A1h).

Wildcard searches are more flexible in WINDOWS 95 than in MS-DOS. For example, *1 finds the filenames (both long filenames and aliases) that end in a 1, and *mid* finds filenames that contain the characters mid. In MS-DOS and in WINDOWS 95 searching on real-mode FAT directories, all characters after the first * are ignored.

Interrupt 21h Function 714Fh Find Next File

```
mov ax, 714Fh           ; Find Next File
mov bx, Handle          ; search handle from Find First File
mov di, seg FindData    ; address of WIN32_FIND_DATA struct
mov es, di
mov di, offset FindData
mov si, DateTimeFormat  ; format for returned date and time
int 21h
```

Searches for the next file in a directory, returning information about the file in the given buffer.

If successful, clears the carry flag, copies information to the specified buffer, and sets the CX register to a combination of these values:

| | |
|---|---|
| 0x0000 | All characters in the primary and alternate name member in the structure specified by FindData were successfully converted from UNICODE. |
| 0x0001 | The primary name returned in the structure specified by FindData contains underscore characters in place of characters that could not be converted from UNICODE. |
| 0x0002 | The alternate name returned in the structure specified by FindData contains underscore characters in place of characters that could not be converted from UNICODE. |

Otherwise, sets the carry flag and sets the AX register to an error value.
Handle Search handle. It must have been previously returned from Find First File (Interrupt 21h Function 714Eh).
FindData Address of a WIN32_FIND_DATA structure that receives information about the file.
DateTimeFormat Date and time format to be returned. It must be one of these values:

| | |
|---|---|
| 0 | Returns the date and time in 64-bit file time format. |
| 1 | Returns the MS-DOS date and time values. |

Interrupt 21h Function 7156h Rename File

```
mov ax, 7156h              ; Rename File
mov dx, seg OldName        ; address of filename or path
mov ds, dx
mov dx, offset OldName
mov di, seg NewName        ; address of new filename or path
mov es, di
mov di, offset NewName
int 21h
jc error
```

Changes the name of the given file or directory to the new name.

If successful, clears the carry flag. Otherwise, sets the carry flag and sets the AX register to an error values.

OldName

Address of a null-terminated string specifying the original name of the file or the directory to rename. Long filenames are allowed.

NewName

Address of a null-terminated string specifying the new name for the file or the directory. Rename File will fail if NewName specifies an existing file or directory. The new name must not specify a drive different than the original drive. Long filenames are allowed.

Interrupt 21h Function 7160h Get Full Path Name

```
mov ax, 7160h
mov cx, 0                  ; Get Full Path Name
mov si, seg SourcePath     ; address of source string
mov ds, si
mov si, offset SourcePath
mov di, seg DestPath       ; address of dest string
mov es, di
mov di, offset DestPath
int 21h
jc error
```

Retrieves the full path for the specified file or path.

If successful, clears the carry flag, modifies the AX register, and returns the full path in the given buffer. Otherwise, sets the carry flag and sets the AX register to an error value.

SourcePath

Address of a null-terminated string that names the file or path to retrieve the full path for. Either the long filename or the standard 8.3 filename format is acceptable.

DestPath

Address of the buffer that receives the full path. The buffer should be large enough to contain the largest possible WINDOWS 95 path (260 characters, including the drive letter, colon, leading backslash, and terminating null character).

When just a filename is specified, Get Full Path Name merges the name of the current drive and directory with the specified filename to determine the full path. Relative paths containing the characters "." and ".." in the SourcePath are filly expanded. The function does no validation, so the specified filename or path does not need to exist.

Interrupt 21h Function 7160h Get Short Path Name

```
mov ax, 7160h
mov cx, 1                  ; Get Short Path Name
mov si, seg SourcePath     ; address of source string
mov ds, si
mov si, offset SourcePath
mov di, seg DestPath       ; address of dest string
mov es, di
mov di, offset DestPath
int 21h
jc error
```

Retrieves the full path in its short form (the standard 8.3 filename format) for the specified file or path. The function returns the 8.3 name for all directories in the path.

If successful, clears the carry flag, modifies the AX register, and returns the full short path in the given buffer. Otherwise, sets the carry flag and sets the AX register to an error value.

SourcePath

Address of a null-terminated sting that names the file or path to retrieve the full short path for. Either the long filename or the short form is acceptable as the source string.

DestPath

Address of the buffer that receives the full path. The buffer should be large enough to contain the largest possible WINDOWS 95 path in the short form (260 characters, including drive letter, colon, leading backslash, and terminating null character).

Relative paths containing the characters "." and ".." in the SourcePath are fully expanded. Since this function performs validation, SourcePath must contain either a valid filename or path.

Interrupt 21h Function 7160h Get Long Path Name

```
mov ax, 7160h
mov cx, 2                  ; Get Long Path Name
mov si, seg SourcePath     ; address of source string
mov ds, si
mov si, offset SourcePath
mov di, seg DestPath       ; address of dest string
mov es, di
mov di, offset DestPath
int 21h
jc error
```

Retrieves the full path in its long filename form for the specified file or path. The function returns the long name for all directories in the path.

If successful, clears the carry flag, modifies the AX register, and returns the full long path in the given buffer. Otherwise, sets the carry flag and sets the AX register to an error value.

SourcePath

Address of a null-terminated string that names the file or path to retrieve the full long path for. Either the long filename or the short form is acceptable as the source string.

DestPath

Address of the buffer that receives the fill path. The buffer should be large enough to contain the largest possible WINDOWS 95 path (260 characters, including drive letter, colon, leading backslash, and terminating null character).

Relative paths containing the characters "." and ".." in the SourcePath are fully expanded. Since this function performs validation, SourcePath must contain either a valid filename or path.

Interrupt 21h Function 716Ch Create or Open File

```
mov ax, 716Ch           ; Create or Open File
mov bx, ModeAndFlags    ; access and sharing modes and flags
mov cx, Attributes      ; file attributes
mov dx, Action          ; action to take
mov si, seg Filename    ; address of filename
mov ds, si
mov si, offset Filename
mov di, AliasHint       ; numeric tail for file's short name
int 21h
jc error
mov [Handle], ax        ; file handle
mov [ActionTaken], cx   ; action taken to open file
```

Creates or opens a file.

If successful, clears carry flag, copies the file handle to the AX register, and sets the CX register to one of these values:

ACTION_OPENED (0001h)
ACTION_CREATED_OPENED (0002h)
ACTION_REPLACED_OPENED (0003h)

Otherwise, sets the carry flag and sets the AX register to an error value.

ModeAndFlags

Combination of access mode, sharing mode, and open flags. It can be one value each from the access and sharing modes and any combination of open flags:

| Access mode | Meaning |
| --- | --- |
| OPEN_ACCESS_READONLY (0000h) | Opens the file for reading only. |
| OPEN_ACCESS_WRITEONLY (0001h) | Opens the file for writing only. |
| OPEN_ACCESS_READWRITE (0002h) | Opens the file for reading and writing. |
| 0003h | Reserved; do not use. |
| OPEN_ACCESS_RO_NOMODLASTACCESS (0004h) | Opens the file for reading only without modifying the file's last access date. |

| Sharing mode | Meaning |
| --- | --- |
| OPEN_SHARE_COMPATIBLE (0000h) | Opens the file with compatibility mode, allowing any process on a given computer to open the file any number of times. |
| OPEN_SHARE_DENYREADWRITE (0010h) | Opens the file and denies both read and write access to other processes. |
| OPEN_SHARE_DENYWRITE (0020h) | Opens the file and denies write access to other processes. |
| OPEN_SHARE_DENYREAD (0030h) | Opens the file and denies read access to other processes. |
| OPEN_SHARE_DENYNONE (0040h) | Opens the file without denying read or write access to other processes but no process may open the file for compatibility access. |

| Open flags | Meaning |
| --- | --- |
| OPEN_FLAGS_NOINHERIT (0080h) | If this flag is set, a child process created with Load and Execute Program (Interrupt 21h Function 4B00h) does not inherit the file handle. If the handle is needed by the child process, the parent process must pass the handle value to the child process. If this flag is not set, child processes inherit the file handle. |
| OPEN_FLAGS_NO_BUFFERING (0100h) | The file is to be opened with no intermediate buffering or caching done by the system. Read and write operations access the disk directly. All reads and writes to the file must be done at file positions that are multiples of the disk sector site and the number of bytes read or written should also be a multiple of the sector size. Applications can determine the sector size with the Get Disk Free Space function (Interrupt 21h, Function 36h). |
| OPEN_FLAGS_NO_COMPRESS (0200h) | The file should not be compressed on a volume that performs file compression. If the volume does not perform file compression, this flag is ignored. This flag is valid only on file creation and is ignored on file open. |
| OPEN_FLAGS_ALIAS_HINT (0400h) | The number in the DI register is to be used as the numeric tail for |

-continued

| | |
|---|---|
| | the alias (short file name) if the default alias is already used by another file. For more information, see AliasHint below. |
| OPEN_FLAGS_NOCRITERR (2000h) | |
| | If a critical error occurs while MS-DOS is opening this file, Critical-Error Handler (Interrupt 24h) is not called. Instead, MS-DOS simply returns an error value to the program. |
| OPEN_FLAGS_COMMIT (4000h) | |
| | After each write operation, MS-DOS commits the file (flushes the contents of the cache buffer to disk). |

Attributes

| | |
|---|---|
| Attributes for files that are created or truncated. They may be a combination of these values: | |
| FILE_ATTRIBUTE_NORMAL (0000h) | |
| | The file can be read from or written to. This value is valid only if used alone. |
| FILE_ATTRIBUTE_READONLY (0001h) | |
| | The file can be read from but not written to or deleted. It can be renamed. |
| FILE_ATTRIBUTE_HIDDEN (0002h) | |
| | The file is hidden and does not appear in an ordinary directory listing. |
| FILE_ATTRIBUTE_SYSTEM (0004h) | |
| | The file is part of the operating system or is used exclusively by it. |
| FILE_ATTRIBUTE_VOLUME (0008h) | |
| | The name specified by Filename is used as the volume label for the current medium and is restricted to the standard 8.3 format. For information about an alternative way to set the volume label, see Set Media ID (Interrupt 21h Function 440Dh Minor Code 46h) in the MS-DOS Programmer's Reference. |
| FILE_ATTRIBUTE_ARCHIVE (0020h) | |
| | The file is an archive file. Applications use this value to mark files for backup or removal. |

Action

| | |
|---|---|
| Action to take it the file exists or if it does not exist. It can be a combination of these values: | |
| FILE_CREATE (0010h) | Creates a new file if it does not already exist. |
| FILE_OPEN (0001h) | Opens the file. The function fails if the file does not exist. |
| FILE_TRUNCATE (0002h) | Opens the file and truncates it to zero length (replaces the existing file). The function fails if the file does not exist. |

The only valid combinations are FILE_CREATE combined with FILE_OPEN or FILE_CREATE combined with FILE_TRUNCATE.

Filename

Address of a null-terminated string specifying the name of the file to be opened or created. The string must be a valid path for the volume associated with the given drive. Long filenames are allowed.

AliasHint

Number that is used in the numeric tail for the alias (short filename) if the default alias already exists. A numeric tail, which consists of the tilde character (~) followed a number, is appended to the end of a filename. If the default alias already exists, the system will construct the alias from the first few characters of the long filename followed by the numeric tail. The system starts with the number 1 in the numeric tail. If that filename is in use, it then uses the number 2. It continues in this fashion until a unique name is found. To override the default numbering scheme you must specify the flag OPEN_FLAGS_ALIAS_HINT when you create the file in addition to specifying this parameter. If a filename already exists with the specified numeric tail, the system uses the default numbering scheme.

A file on a remote directory—that is, a directory on the network-cannot be opened, created or modified unless the appropriate permissions for the directory exist.

Interrupt 21h Function 71A0h Get Volume Information

| | |
|---|---|
| mov ax, 71A0h | ; Get Volume Information |
| mov di, seg Buffer | ; addr of buffer that receives file system name |
| mov es, di | |
| mov di, offset Buffer | |
| mov cx, BufSize | ; size of buffer, in bytes |
| mov dx, seg RootName | ; address of root directory path |
| mov ds, dx | |
| mov dx, offset RootName | |
| int 21h | |
| jc error | |
| mov [Flags], bx | ; file system flags |
| mov [MaxFilename], cx | ; max. filename length including null |
| mov [MaxPath], dx | ; max. path length including null |

Returns information about the volume associated with the given root directory.

If successful, clears the carry flag, copies the file system name to the buffer given by the ES:DI register pair, and sets the BX, CX, and DX registers to these values:

| | |
|---|---|
| BX | File system flags. It can be a combination of these values: FS_CASE_SENSITIVE (0001h) |

-continued

```
    Specifies that searches are case-sensitive.
FS_CASE_IS_PRESERVED (0002h)
    Preserves case in directory entries.
FS_UNICODE_ON_DISK (0004h)
    Uses Unicode characters in file and directory names.
FS_LFN_APIS (4000h)
    Supports new long filename functions.
FS_VOLUME_COMPRESSED (8000h)
    Specifies that the volume is compressed.
CX  Maximum allowed length, including terminating null character,
    of a filename for this volume.
DX  Maximum allowed length of a path for this volume, including
    drive letter, colon, leading slash, and terminating null
    character.
```

Otherwise, sets the carry flag and sets the AX register to an error value.
Buffer
Address of a buffer that receives a null-terminated string specifying the name of the file system.
BuffSize
Size, in bytes, of the buffer that receives the name. The buffer should include space for the terminating null character.
RootName
Address of a null-terminated string specifying the name of the root directory of the volume to check. This parameter must not be NULL, or the function will fail. The format for this parameter is: "C:\".
This function accesses the disk the first time it is called, but subsequent calls do not access the disk.
Interrupt 21h Function 71A1h Find Close

```
mov ax, 71A1h      ; Find Close
mov bx, Handle     ; search handle from Find First File
int 21h
jc error
```

Closes the file search referred to by Handle.
If successful, clears the carry flag. Otherwise, sets the carry flag and sets the AX register to an error value.
Handle
Search handle. It must have been previously returned from Find First File (Interrupt 21h Function 714Eh).
Interrupt 21h Function 71A6h Get File Info By Handle

```
mov ax, 71a6h          ; Get File Info By Handle
mov bx, Handle         ; handle of file
mov dx, seg lpFileInfo ; address of
mov ds, dx             ; BY_HANDLE_FILE_INFORMATION
                         struct
mov dx, offset lpFileInfo
int 21h
```

Retrieves information about the specified file.
If successful, clears the carry flag. Otherwise, sets the carry flag and sets the AX register to an error value.
Handle
File handle to retrieve information about. It must have been previously returned by using Create or Open File (Interrupt 21h Function 716Ch) or Extended File Open (Interrupt 21h Function 6Ch).
lpFileInfo
Address of a BY_HANDLE_FILE_INFORMATION structure that receives the file information. The structure can be used in subsequent calls to Get File Info By Handle to refer to the information about the file.
Interrupt 21h Function 71A7h File Time To DOS Time

```
mov ax, 71A7h        ; date and time format conversion
mov bl, 0            ; File Time To DOS Time
mov si, seg lpft     ; address of FILETIME structure
mov ds, si
mov si, offset lpft
int 21h
jc error
mov [DOSTime], cx
mov [DOSDate], dx
mov [MilliSeconds], bh ; number of 10 ms intervals in 2 seconds
```

Converts a 64-bit file time to MS-DOS date and time values.
If successful, clears the carry flag, and sets the BH, CX, and DX registers to these values:

| Bits | Contents |
| --- | --- |
| BH | Number of 10 millisecond intervals in 2 seconds to add to the MS-DOS time. It can be a value in the range 0 to 199. |
| CX | MS-DOS time. The time is a packed 16-bit value with the following form: |
| 0–4 | Second divided by 2 |
| 5–10 | Minute (0–59) |
| 11–15 | Hour (0-23 on a 24-hour clock) |
| DX | MS-DOS date. The date is a packed 16-bit value with the following form: |
| 0–4 | Day of the month (1–31) |
| 5–8 | Month (1 = January, 2 = February, and so on) |
| 9–15 | Year offset from 1980 (add 1980 to get the actual year) |

Otherwise, sets the carry flag and sets the AX register to an error value.
lpft
Address of a FILETIME structure containing the 64-bit file time to convert to the MS-DOS date and time format.
The MS-DOS date format can represent only dates between 1/1/1980 and 12/31/2107; this conversion fails if the input file time is outside this range.
Interrupt 21h Function 71A7h DOS Time To File Time

```
mov ax, 71A7h          ; date and time format conversion
mov bl, 1              ; Dos Time To File Time
mov bh, MilliSeconds   ; number of 10 ms intervals in 2 seconds
mov cx, DOSTime
mov dx, DOSDate
mov di, seg lpft       ; address of FILETIME structure
mov es, di
mov di, offset lpft
int 21h
jc error
```

Converts MS-DOS date and time values to 64-bit file time.
If successful, clears the carry flag and returns the 64-bit file time in the specified file time structure. Otherwise, sets the carry flag and sets the AX register to an error value.
MilliSeconds
Number of 10 millisecond intervals in 2 seconds to add to the MS-DOS time. It can be a value in the range 0 to 199.
DOSTime
MS-DOS time to convert. The time is a packed 16-bit value with the following form:

| Bits | Contents |
|---|---|
| 0–4 | Second divided by 2 |
| 5–10 | Minute (0–59) |
| 11–15 | Hour (0–23 on a 24-hour clock) |

DOSDate

MS-DOS date to convert. The date is a packed 16-bit value with the following form:

| Bits | Contents |
|---|---|
| 0–4 | Day of the month (1–31) |
| 5–8 | Month (1 = January, 2 = February, and so on) |
| 9–15 | Year offset from 1980 (add 1980 to get the actual year) | lpft

Address of a FILETIME structure to receive the converted 64-bit file time.
Structures
BY_HANDLE_FILE_INFORMATION

```
BY_HANDLE_FILE_INFORMATION struc
    dwFileAttributes       dd ?          ; see below
    ftCreationTime         dd 2 dup(?)   ; see below
    ftLastAccessTime       dd 2 dup(?)   ; see below
    ftLastWriteTime        dd 2 dup(?)   ; see below
    dwVolumeSerialNumber   dd ?          ; see below
    nFileSizeHigh          dd ?          ; see below
    nFileSizeLow           dd ?          ; see below
    nNumberOfLinks         dd ?          ; see below
    nFileIndexHigh         dd ?          ; see below
    nFileIndexLow          dd ?          ; see below
BY_HANDLE_FILE_INFORMATION ends
```

Contains file information retrieved by Get File Info By Handle (Interrupt 21h Function 71A6h). dwFileAttributes
File attributes. It can be one or more of these values:
FILE_ATTRIBUTE_NORMAL (00000000h)
The file can be read from or written to. This value is valid only if used alone.
FILE_ATTRIBUTE_READONLY (00000001h)
The file can be read from but not written to or deleted. It can be renamed.
FILE_ATTRIBUTE_HIDDEN (00000002h)
The file is hidden and does not appear in an ordinary directory listing.
FILE_ATTRIBUTE_SYSTEM (00000004h)
The file is part of the operating system or is used exclusively by it.
FILE_ATTRIBUTE_DIRECTORY (00000010h)
The name specifies a directory, not a file.
FILE_ATTRIBUTE_ARCHIVE (00000020h)
The file is an archive file. Applications use this value to mark files for backup or removal.
ftCreationTime
Time that the file was created in 64-bit file time format. A value of 0,0 indicates that the file system containing the file does not support this member.
ftLastAccessTime
Time that the file was last accessed in 64-bit file time format. A value of 0,0 indicates that the file system containing the file does not support this member.
ftLastWriteTime
Time that the file was last written to in 64-bit file time format. All file systems support this member. If the underlying file system does not support the last write time, ftLastWriteTime is the time the file was created.
dwVolumeSerialNumber
Serial number of the volume that contains the file.
nFileSizeHigh
High-order word of the file size.
nFileSizeLow
Low-order word of the file size.
nNumberOfLinks
Number of links to this file. For FAT and HPFS file systems, this member is always 1. For NTFS, it may be more than 1.
nFileIndexHigh
High-order word of a unique identifier associated with the file.
nFileIndexLow
Low-order word of a unique identifier associated with the file. This identifier and the volume serial number uniquely identify a file. This number may change when the system is restarted or when the file is opened. After a process opens a file, the identifier is constant until the file is closed. An application can use this identifier and the volume serial number to determine whether two handles refer to the same file.

The value returned by nFileIndexHigh and nFileIndexLow may be invalid on some file systems, such as real-mode network redirected file systems. In this case, an invalid index value will be returned.
FILETIME

```
FILETIME struc
    dwLowDateTime dd ?; see below
    dwHighDateTime dd ?; see below
FILETIME ends
```

Contains a 64-bit value specifying the number of 100-nanosecond intervals that have elapsed since 12:00 A.M. Jan. 1, 1901.
dwLowDateTime
Low-order 32 bits of the file time.
dwHighDateTime
High-order 32 bits of the file time.
WIN32_FIND_DATA

```
WIN32_FIND_DATA struc
    dwFileAttributes    dd ?              ; see below
    ftCreationTime      dd 2 dup(?)       ; see below
    ftLastAccessTime    dd 2 dup(?)       ; see below
    ftLastWriteTime     dd 2 dup(?)       ; see below
    nFileSizeHigh       dd ?              ; high word of
                                          ; file size,
                                          ; in bytes
    nFileSizeLow        dd ?              ; low word of
                                          ; file size,
                                          ; in bytes
    dwReserved0         dd 0              ; reserved;
                                          ; do not use
    dwReserved1         dd 0              ; reserved;
                                          ; do not use
    cFileName           db MAX_PATH dup(?) ; see below
    cAlternateFileName  db 14 dup(?)       ; see below
WIN32_FIND_DATA ends
```

Describes a file found by Find First File (Interrupt 21h Function 714Eh) or Find Next File (Interrupt 21h Function 714Fh).
dwFileAttributes File attributes of the file found. They can be one or more of these values:

FILE_ATTRIBUTE_NORMAL (00000000h)
   The file can be read from or written to. This value is valid only if used alone.
FILE_ATTRIBUTE_READONLY (00000001h)
   The file can be read from but not written to or deleted. It can be renamed.
FILE_ATTRIBUTE_HIDDEN (00000002h)
   The file is hidden and does not appear in an ordinary directory listing.
FILE_ATTRIBUTE_SYSTEM (00000004h)
   The file is part of the operating system or is used exclusively by it.
FILE_ATTRIBUTE_DIRECTORY (00000010h)
   The name specifies a directory, not a file.
FILE_ATTRIBUTE_ARCHIVE (00000020h)
   The file is an archive file. Applications use this value to mark files for backup or removal.

ftCreationTime
   Time that the file was created in 64-bit file time format. A value of 0,0 indicates that the file system containing the file does not support this member.

ftLastAccessTime
   Time that the file was last accessed in 64-bit file time format. A value of 0,0 indicates that the file system containing the file does not support this member.

ftLastWriteTime
   Time that the file was last written to in 64-bit file time format. All file systems support this member.

cFileName
   Null-terminated string that is the name of the file. Since long filenames are allowed, the buffer size must be large enough for 256 characters, including the terminating null character.

cAlternateFileName
   Null-terminated string, in standard 8.3 filename format, that is an alternate name of the file. If the cFileName member contains an 8.3-format name or the file system does not permit 8.3-format alternates, this member is set to 0.

We claim:

1. An application program interface for creating and managing files and directories having long and short filenames in an MS-DOS operating system, comprising:
   (a) retrieving a function based on a designated command;
   (b) copying parameters of the function to at least one register;
   (c) issuing an Interrupt 21h instruction;
   (d) executing the function according to the issued Interrupt 21h instruction;
   (e) converting 64-bit file time to MS-DOS date and time values; and
   (f) converting MS-DOS date and time values to 64-bit file time.

2. The application program interface of claim 1, wherein the function is selected from a group, comprising 5704h, 5705h, 5706h, 5707h, 7139h, 713Ah, 713Bh, 7141h, 7143h, 7147h, 714Eh, 714Fh, 7156h, 7160h, 716Ch, 71A0h, 71A1h, 71A6h and 71A7h.

3. A computer system including a microprocessor and a software program, the software program utilizing an application program interface to request services from an operating system that does not support filenames with greater than eight characters in a leading portion or three characters in an extension portion, the requested services relating to interaction with short and long filenames, the application program interface including a plurality of commands for requesting services from the operating system, comprising:
   (a) getting a last access date and time;
   (b) setting the last access date and time;
   (c) getting a creation date and time;
   (d) setting the creation date and time;
   (e) making a directory;
   (f) removing the directory;
   (g) changing the directory;
   (h) deleting a file;
   (i) setting attributes of a file;
   (j) getting the current directory;
   (k) finding a first file;
   (l) finding a next file;
   (m) renaming a file;
   (n) getting a full path name;
   (o) getting a short path name;
   (p) getting a long path name;
   (q) creating a file;
   (r) opening a file;
   (s) getting volume information;
   (t) closing the file search;
   (u) getting file information by handle;
   (v) converting 64-bit file time to MS-DOS date and time values; and
   (x) converting MS-DOS date and time values to 64-bit file time.

4. A method for employing an operating system and an application program interface to provide a plurality of functions in the operating system, comprising:
   (a) providing a first function in the operating system for creating a directory with a short name that has a leading portion with a maximum of eight characters and an extension portion with a maximum of three characters;
   (b) providing a second function in the operating system for creating another directory with a long name having greater than twelve characters; and
   (c) when calling the second function to create the other directory having the long name and create at least one directory entry to hold the long name, automatically calling the first function to create the directory having the short name and create at least one directory entry to hold the short name, at least a portion of the short name created for the directory corresponding to the long name created for the other directory, wherein each short name and each long name stored in each respective directory entry is employable as an index for locating data associated with a file name.

5. The method of claim 4, wherein the operating system supports a plurality of numbered software interrupts and wherein the second function is called by generating software interrupt number 21 in hexadecimal notation.

6. The method of claim 5, wherein the operating system supports an AX register and the second function is called when a value of 7139 in hexadecimal notation is disposed in the AX register.

7. A method for employing an operating system and an application program interface to provide a plurality of functions in the operating system, comprising:
   (a) providing a first function in the operating system for removing a directory with a short name that has a leading portion with a maximum of eight characters and an extension portion with a maximum of three characters and deleting a directory entry for the short name;

(b) providing a second function in the operating system for removing a directory with a long name with greater than twelve characters and deleting a directory entry for the long name; and (c) when calling the second function to remove the other directory having the long name and delete at least one directory entry in which the long name is held, automatically calling the first function to remove the directory having the short name and delete at least one directory entry in which the short name is held, at least a portion of the short name of the directory corresponding to the long name of the other directory, wherein each short name and each long name stored in each respective directory entry is employable as an index for locating data associated with a file name.

8. The method of claim 7, wherein the operating system supports a plurality of numbered software interrupts and wherein the second function is called by generating software interrupt number 21 in hexadecimal notation.

9. The method of claim 8, wherein the operating system supports an AX register and the second function is called when a value of 713A in hexadecimal notation is disposed in the AX register.

10. A method for employing an operating system and an application program interface to provide a plurality of functions in the operating system, comprising:

(a) providing a first function in the operating system for deleting a file with a short name that has a leading portion with a maximum of eight characters and an extension portion with a maximum of three characters, wherein the file with the short name is located in a directory with a short name having a leading portion with a maximum of eight characters and an extension portion with a maximum of three characters;

(b) providing a second function in the operating system for deleting another file with a long name with greater than twelve characters, wherein the file with the long name is located in another directory with a long name having greater than twelve characters; and (c) when the second function is called to delete the other file having the long name located in the other directory with the long name, automatically calling the first function to delete the file having the short name located in the directory with the short name, at least a portion of the short name of the file corresponding to the long name of the other file.

11. The method of claim 10, wherein the operating system supports a plurality of numbered software interrupts, and wherein the second function is called by generating software interrupt number 21 in hexadecimal rotation.

12. The method of claim 11, wherein the operating system supports an AX register and the second function is called when a value of 7141 in hexadecimal notation is disposed in the AX register.

13. A method for employing an operating system and an application program interface to provide a plurality of functions in the operating system, comprising:

(a) providing a first function in the operating system for renaming a file having a short name that has a leading portion with a maximum of eight characters and an extension portion with a maximum of three characters, wherein the file with the short name is located in a directory with a short name having a leading portion with a maximum of eight characters and an extension portion with a maximum of three characters;

(b) providing a second function in the operating system for renaming another file having a long name with greater than twelve characters, wherein the file with the long name is located in another directory with a long name having greater than twelve characters; and (c) when the second function is called to rename the other file having the long name located in the other directory with the long name, automatically calling the first function to rename the file having the short name located in the directory with the short name, at least a portion of the short name of the file corresponding to the long name of the other file.

14. The method of claim 13, wherein the operating system supports a plurality of numbered software interrupts and wherein the second function is called by generating software interrupt number 21 in a hexadecimal notation.

15. The method of claim 14, wherein the operating system supports an AX register and the second function is called when a value of 7156 in hexadecimal notation is disposed in the AX register.

16. A method for employing an operating system and an application program interface to provide a plurality of functions in the operating system, comprising:

(a) providing a first function in the operating system for finding a file with a short file name that has a leading portion with a maximum of eight characters and an extension portion with a maximum of three characters, wherein the file with the short name is located in a directory with a short name having a leading portion with a maximum of eight characters and an extension portion with a maximum of three characters;

(b) providing a second function in the operating system for finding the file with a long file name having greater than twelve characters wherein the file with the long name is located in another directory with a long name having greater than twelve characters; and (c) when the first function is called to find the file by its short file name located in the directory with the short name, automatically calling the second function to find the file by its long file name located in the other directory with the long name, at least a portion of the short file name of the file corresponding to the long file name of the file.

17. The method of claim 16, wherein the operating system supports a plurality of numbered software interrupts and wherein the second function is called when software interrupt number 21 in hexadecimal notation is generated.

18. The method of claim 17, wherein the operating system includes an AX register and the second function is called when a value 714E in hexadecimal notation is disposed in the AX register.

19. The method of claim 17, wherein the operating system supports an AX register and the second function is called when a value 714F in hexadecimal notation is disposed in the AX register.

20. A computer-readable storage medium holding an operating system, the operating system employing an application program interface to provide a plurality of functions in the operating system:

(a) a first function in the operating system for finding a file with a short file name that has a leading portion with a maximum of eight characters and an extension portion with a maximum of three characters, wherein the file with the short name is located in a directory with a short name having a leading portion with a maximum of eight characters and an extension portion with a maximum of three characters;

(b) a second function in the operating system for finding the file with a long file name having greater than twelve characters, wherein the file with the long name is located in another directory with a long name having greater than twelve characters; and (c) when the first function is called to find the file by its short file name located in the directory with the short name, automatically calling the second function to find the file by its long file name located in the other directory with the long name, at least a portion of the short file name of the file corresponding to the long file name of the file.

21. A computer-readable storage medium holding an operating system, said operating system employing an application program interface to provide a plurality of functions in the operating system, including:

(a) a first function in the operating system for creating a directory with a short name that has a leading portion with a maximum of eight characters and an extension portion with a maximum of three characters;

(b) a second function in the operating system for creating another directory with a long name with greater than twelve characters; and (c) when the second function is called to create the directory having the long name, automatically calling the first function to create the directory with the short name, at least a portion of the short name of the directory corresponding to the long name of the other directory, wherein each short name and each long name stored in each respective directory entry is employable as an index for locating data associated with a file name.

22. A computer-readable storage medium holding an operating system, said operating system employing an application program interface to provide a plurality of functions in the operating system, including:

(a) a first function in the operating system for removing a directory with a short name that has a leading portion with a maximum of eight characters and an extension portion with a maximum of three characters;

(b) a second function in the operating system for removing another directory with a long name with greater than twelve characters; and (c) when the second function is called to remove the directory having the long name, automatically calling the first function to remove the directory with the short name, at least a portion of the short name of the directory corresponding to the long name of the other directory, wherein each short name and each long name stored in each respective directory entry is employable as an index for locating data associated with a file name.

23. A computer-readable storage medium holding an operating system, said operating system employing an application program interface to provide a plurality of functions in the operating system, including:

(a) a first function in the operating system for deleting a file with a short name that has a leading portion with a maximum of eight characters and an extension portion with a maximum of three characters, wherein the file with the short name is located in a directory with a short name having a leading portion with a maximum of eight characters and an extension portion with a maximum of three characters;

(b) a second function in the operating system for deleting another file with a long name with greater than twelve characters, wherein the file with the long name is located in another directory with a long name having greater than twelve characters; and (c) when the second function is called to delete the file having the long name located in the other directory with the long name, automatically calling the first function to delete the file having the short name located in the directory with the short name, at least a portion of the short name of the file corresponding to the long name of the other file.

24. A computer-readable storage medium holding an operating system, said operating system employing an application program interface to provide a plurality of functions in the operating system, including:

(a) a first function in the operating system for renaming a file having a short name that has a leading portion with a maximum of eight characters and an extension portion with a maximum of three characters, wherein the file with the short name is located in a directory with a short name having a leading portion with a maximum of eight characters and an extension portion with a maximum of three characters;

(b) a second function in the operating system for renaming another file having a long name with greater than twelve characters, wherein the file with the lone name is located in another directory with a long name having greater than twelve characters; and (c) when the second function is called to rename the other file having the long name located in the other directory with the long name, automatically calling the first function to rename the file having the short name located in the directory with the short name, at least a portion of the short name of the file corresponding to the long name of the other file.

* * * * *

UNITED STATES PATENT AND TRADEMARK OFFICE
CERTIFICATE OF CORRECTION

PATENT NO. : 6,286,013 B1
DATED : September 4, 2001
INVENTOR(S) : A.R. Reynolds et al.

It is certified that error appears in the above-identified patent and that said Letters Patent is hereby corrected as shown below:

<u>Title page, Item [54] and Column 1, line 3,</u>
"FILE NAMES" should read -- FILENAMES --

<u>Title page,</u>
Item [63], Related U.S. Application Data, "08/042,004," should read -- 08/427,004, --
Item [56], References Cited, U.S. PATENT DOCUMENTS, delete in its entirety the reference beginning "5,329,427"; and delete in its entirety the reference beginning "5,363,497"

<u>Column 1,</u>
Line 7, "APPLICATION" should read -- APPLICATIONS --
Line 12, "abandoned." should read -- abandoned, which was a continuation-in-part of U.S. patent application Ser. No. 08/427,004, filed Apr. 4, 1995, now U.S. patent no. 5,579,517, which is a continuation-in-part of U.S. patent application Ser. No. 08/711,692, filed Sep. 5, 1996, now U.S. patent no. 5,758,352. --

<u>Column 3,</u>
Line 8, "by user" should read -- by the user --

<u>Column 4,</u>
Line 35, "in FIG. 1" should read -- in FIG. 1, --
Line 67, "and thus," should read -- and, thus, --

<u>Column 6,</u>
Line 13, "and 52" should read -- and 52, --
Line 57, "(step 54)" should read -- (step 54) --

<u>Column 7,</u>
Line 14, "space" should read -- spaces --

<u>Column 8,</u>
Line 25, "programs, that" should read -- programs, which --

UNITED STATES PATENT AND TRADEMARK OFFICE
CERTIFICATE OF CORRECTION

PATENT NO.    : 6,286,013 B1
DATED         : September 4, 2001
INVENTOR(S)   : A.R. Reynolds et al.

It is certified that error appears in the above-identified patent and that said Letters Patent is hereby corrected as shown below:

Column 10,
Line 12, "This article" should read -- The following --
Line 29, "256 characters," should read -- 256 characters. Protected-mode FAT allows paths of up to 260 characters, --
Line 45, before "#" insert -- ^ --

Column 13,
Line 54, after "Down-Level Systems" begin new paragraph with -- Long filenames, --

Column 16,
Line 2, "Last Access Date and" should read -- Last Access Date and Time --

Column 19,
Line 66, "Action to take it" should read -- Action to take if --

Column 21,
Line 34, "can not" should read -- cannot --

Column 27,
Line 17, "an error values." should read -- an error value. --
Line 59, "and "." in" should read -- and ".." in --
Line 60, "filly" should read -- fully --

Column 28,
Line 64, "fill path." should read -- full path. --

Column 31,
Line 34, "Action to take it" should read -- Action to take if --
Line 66, "network-cannot" should read -- network--cannot --

Column 33,
Line 21, "BuffSize" should read -- BufSize --
Line 50, "mov ax, 71a6h" should read -- mov ax, 71A6h --

UNITED STATES PATENT AND TRADEMARK OFFICE
CERTIFICATE OF CORRECTION

PATENT NO.    : 6,286,013 B1
DATED         : September 4, 2001
INVENTOR(S)   : A.R. Reynolds et al.

It is certified that error appears in the above-identified patent and that said Letters Patent is hereby corrected as shown below:

Column 35,
Line 40, after "Function 71A6h)." begin a new heading "dwFileAttributes"

Column 38,
Line 32, "(x)" should read -- (w) --

Column 40,
Line 38, "twelve characters wherein" should read -- twelve characters, wherein --
Line 63, "system:" should read -- system, including: --

Column 42,
Line 43, "lone name" should read -- long name --

Signed and Sealed this

Twentieth Day of January, 2004

JON W. DUDAS
*Acting Director of the United States Patent and Trademark Office*